(12) United States Patent
Hirano et al.

(10) Patent No.: US 7,839,446 B2
(45) Date of Patent: Nov. 23, 2010

(54) IMAGE CAPTURING APPARATUS AND IMAGE DISPLAY APPARATUS INCLUDING IMPARTING DISTORTION TO A CAPTURED IMAGE

(75) Inventors: Tomomi Hirano, Hachioji (JP); Takao Shimadate, Hachioji (JP)

(73) Assignee: Olympus Corporation, Tokyo (JP)

( * ) Notice: Subject to any disclaimer, the term of this patent is extended or adjusted under 35 U.S.C. 154(b) by 680 days.

(21) Appl. No.: 11/467,607

(22) Filed: Aug. 28, 2006

(65) Prior Publication Data
US 2007/0046804 A1 Mar. 1, 2007

(30) Foreign Application Priority Data
Aug. 30, 2005 (JP) ............................... 2005-249668
Sep. 28, 2005 (JP) ............................... 2005-281467

(51) Int. Cl.
H04N 5/222 (2006.01)
H04N 5/217 (2006.01)
H04N 5/235 (2006.01)
(52) U.S. Cl. ................. 348/333.09; 348/241; 348/222.1
(58) Field of Classification Search ............ 348/333.09, 348/333.11–333.12
See application file for complete search history.

(56) References Cited

U.S. PATENT DOCUMENTS

| 5,172,234 | A * | 12/1992 | Arita et al. ................ 348/240.2 |
| 5,675,380 | A * | 10/1997 | Florent et al. ................ 348/251 |
| 6,154,210 | A * | 11/2000 | Anderson .................... 715/840 |
| 7,369,164 | B2 * | 5/2008 | Parulski et al. ......... 348/231.99 |
| 7,454,707 | B2 * | 11/2008 | Matsumoto .................. 715/725 |
| 2003/0133025 | A1 * | 7/2003 | Ojima et al. ............. 348/240.2 |
| 2003/0160886 | A1 * | 8/2003 | Misawa et al. ............... 348/347 |
| 2006/0050151 | A1 * | 3/2006 | Fujinawa ............... 348/207.99 |

FOREIGN PATENT DOCUMENTS

| JP | 10-233950 A | 9/1998 |
| JP | 11-261868 A | 9/1999 |
| JP | 2000-316109 A | 11/2000 |
| JP | 2001-78069 A | 3/2001 |

(Continued)

OTHER PUBLICATIONS

Japanese Office Action dated Jun. 22, 2010, issued in corresponding Japanese Patent Application No. 2005-281467.

*Primary Examiner*—Justin P Misleh
(74) *Attorney, Agent, or Firm*—Westerman, Hattori, Daniels & Adrian, LLP

(57) ABSTRACT

An image-capturing apparatus has an optical system imparting distortion to an image of an object to be captured so that the distortion is imparted so that a central portion of the image is magnified and a peripheral portion is reduced; an image-processing circuit for compensating the distortion in the initial image data having first perspective angle established to the same initial image data and the distortion in the initial image data having second perspective angle which is different from the first perspective angle; and generating first image and second image that do not include the distortion corresponding to the first and second perspective angles; a finder for displaying at least one of the first and second images; and a display-control circuit having a simultaneous display mode which can display the first and the second images in a view in the finder simultaneously.

4 Claims, 17 Drawing Sheets

FOREIGN PATENT DOCUMENTS

| | | |
|---|---|---|
| JP | 2002-57937 A | 2/2002 |
| JP | 2003-78801 A | 3/2003 |
| JP | 2004-64795 A | 2/2004 |
| JP | 2004-200950 A | 7/2004 |
| JP | 2004-289225 A | 10/2004 |
| JP | 2005-56295 A | 3/2005 |

* cited by examiner

WIDE-ANGLE
PERSPECTIVE VIEW

TELESCOPIC
PERSPECTIVE VIEW

FIG. 15A
PRIOR ART
WIDE-ANGLE PERSPECTIVE VIEW
FIG. 15B
PRIOR ART
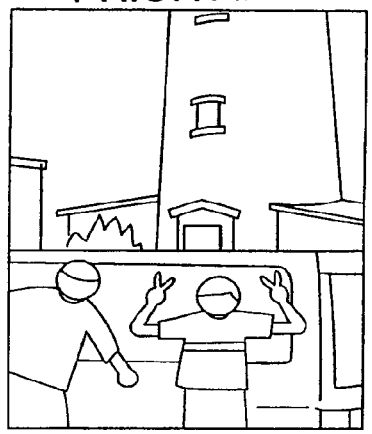
TELESCOPIC PERSPECTIVE VIEW
FIG. 16A   PRIOR ART
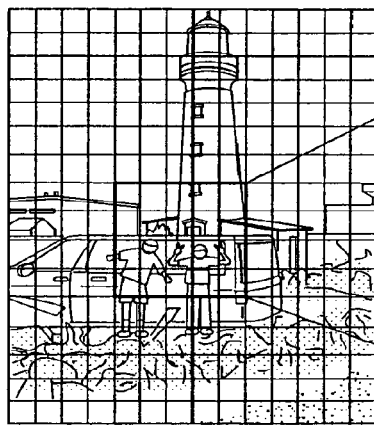  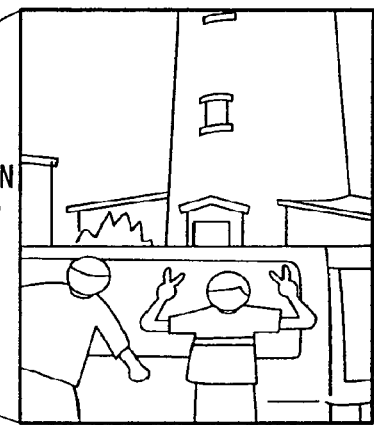
MAGNIFICATION (TELESCOPIC)
FIG. 16B   PRIOR ART
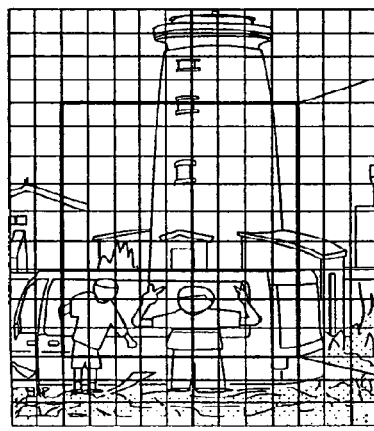 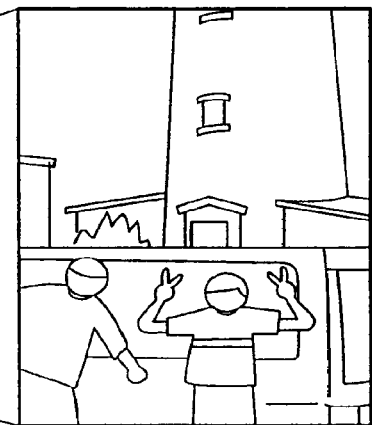

IMAGE CAPTURING APPARATUS AND IMAGE DISPLAY APPARATUS INCLUDING IMPARTING DISTORTION TO A CAPTURED IMAGE

The present application is based on patent applications No. 2005-249668 filed in Japan, Aug. 30, 2005, and No. 2005-281467, filed in Japan, Sep. 28, 2005, the content of which are incorporated herein by reference.

BACKGROUND OF THE INVENTION

1. Field of the Invention

The present invention relates to an image capturing apparatus and an image display method, and in particular, relates to an image capturing apparatus and an image display method which are suitable for obtaining a wide-angle image and a telescopic image simultaneously and for displaying both images on a display in a finder.

2. Description of Related Art

Conventionally, in image-inputting apparatuses, e.g., video cameras and digital cameras, a zoom function is commonly used for varying focal lengths, i.e., perspective angle of a lens in view of a distance between the camera and an object to be captured, in order to magnify and reduce image size. In order to prevent failure in capturing the object, a camera must have a finder visualizing an image corresponding to a desirable perspective angle. Generally, the zoom function can be categorized into an optical zoom which is realized by moving lenses contained in a lens unit mechanically; and an electronic zoom which is realized by interpolating new pixels between pixels generated based on image data output from an imaging device, e.g., a charge-coupled device (CCD).

Since the image obtained by the optical zoom has a desirable perspective angle in the finder, it is not necessary to conduct image processing operation because both the image obtained in the finder and the image to be captured by the zoom lens will not be deteriorated.

In contrast, since the electronic zoom is realized by conducting the image processing operations with respect to the image obtained through an optical system. In this case, mechanical focusing is not necessary if the perspective angle is varied by the electronic zoom function. Therefore, the electronic zoom is advantageous due to its quickness. Multi-display image capturing devices which can display through-images corresponding to various magnifications have been proposed in order to realize such advantage obtained by the electronic zoom (see, e.g., Japanese Unexamined Patent Application, First Publication No. 2004-200950). In this device, images of an object corresponding to a plurality of perspective angles are displayed on a finder by an electronic zoom function, and an image of the object is captured by selecting a composition corresponding to a desirable perspective angle, i.e., focal length using an optical zoom function. This device has advantages, e.g., finding the object before capturing the image thereof in a desirable composition; and capturing the image quickly.

In general, a main object is commonly disposed in a central portion of the captured image. In such a case, in order to display a telescopic image in the finder by the electronic zoom function, a central portion of the image corresponding to the telescopic image as shown in FIG. 16B must be trimmed from a wide-angle image shown in FIG. 16A. In addition, the perspective angle of the trimmed telescopic image must be adjusted to a display area in the finder by interpolating pixels corresponding to image data of the trimmed central portion.

SUMMARY OF THE INVENTION

An object of the present invention is to provide an image-capturing apparatus and a method for displaying both the wide-angle image and the telescopic image in the finder as shown in FIGS. 15A and 15B so that the interpolation is conducted at a minimum, and deterioration of the electronically-zoomed image can be prevented.

First aspect of the present invention proposes solutions as follows.

In the present invention, an image capturing apparatus includes: an optical system imparting distortion to an image of an object to be captured in which the distortion is so that a central portion of the image is magnified and a peripheral portion is reduced; an image sensor having an image-capturing elements having a receiving surface, onto which the image having the distortion is focused by the optical system, for converting the focused image including the distortion into initial image data and outputting thereof, an image-processing circuit for compensating the distortion in the initial image data having first perspective angle established to the same initial image data and the distortion in the initial image data having second perspective angle which is different from the first perspective angle, and generating first image and second image that do not include the distortion corresponding to the first and second perspective angles; a finder for displaying at least one of the first and second images; and a display-control circuit having a simultaneous display mode which can display the first and the second images in a view in the finder simultaneously.

The method for displaying an image according to the present invention uses an optical system which imparts distortion to an object image to be captured so as to magnify a central portion of the object image; and to reduce a peripheral portion of the object image. The method includes: converting the object image, having the distortion, focused by the optical system into an initial image data; outputting the initial image data; compensating the distortion in the initial image data having the established first and second perspective angles set to the same initial image data, the second perspective angle being different from the first perspective angle; and displaying the first and second images in a view in the finder simultaneously.

Image data obtained by the optical system of the present invention is dense in the central portion of the captured image because the optical system imparts distortion to the captured image so that the central portion of the captured image is magnified and a peripheral portion of the captured image is reduced. Since this image data is used, the electrically-zoomed telescopic image obtained by the present invention meets less image deterioration than the conventional electrically-zoomed telescopic image, and therefore, the first image, e.g., a high-quality wide-angle image and high-quality second image, e.g., a telescopic image can be displayed in a view in the finder simultaneously.

The present invention proposes the image capturing apparatus in which the display-control circuit further has a reverse display mode for reversing an area corresponding to the first image and an area corresponding to the second image in the simultaneous display mode.

In the present invention, since the display-control circuit further has the reverse display mode for reversing the area corresponding to the first image and the area corresponding to the second image in the simultaneous display mode, a user can change his point of view in the finder with respect to the object image having a desirable perspective angle.

The present invention proposes the image capturing apparatus in which the display-control circuit further has a single display mode for displaying one of the first image and the second image displayed in the simultaneous display mode in a view in the finder.

In the present invention, since the display-control circuit further has the single display mode for displaying one of the first image and the second image displayed in the simultaneous display mode in a view in the finder, the user can observe the object image in singularly, i.e., a non-multi-displayed view in the finder. Therefore, the user can observe the object image in more detail.

The present invention proposes the image capturing apparatus in which the display-control circuit further has an initial-image-display mode for switching from the first or second images to images relating to the initial image data in the finder.

In the present invention, since the display-control circuit further has the initial-image-display mode for switching from the first or second images to images relating to the initial image data in the finder, the user can observe the initial image for reference.

The present invention proposes the image capturing apparatus in which the display-control circuit further has a menu-display mode which shows menu for selecting functions in a view in the finder.

In the present invention, since the display-control circuit further has the menu-display mode which shows menus for selecting functions in a view in the finder, the user can select the desired function in the menu by comparing the displayed object images.

The present invention proposes the image capturing apparatus which further has: a mode-selecting section for selecting the display modes; a display-position-calculating section, disposed in the display-control circuit for calculating the position of each image in the finder in accordance with the display modes; and a display-converting section, disposed in the display-control circuit, for outputting the image to the finder so that the image is disposed in the finder in accordance with the calculation.

In the present invention, the image capturing apparatus further has the mode-selecting section for selecting the display modes. In addition, the display-control circuit calculates the position of each image in the finder in accordance with the display modes; and outputs the image to the finder so that the image is disposed in the finder in accordance with the calculation. Therefore, at least one image can be displayed in the selected mode in a single display manner.

The present invention proposes the image-capturing apparatus which further has at least a memory apparatus for storing the first and the second images.

In the present invention, the first and the second images are stored in the memory apparatus separately. Therefore, it is possible to shorten the length of time to generate images-to-be-displayed because the calculation is not as necessary as in a case in which new image data must be generated based on the initial image data.

The present invention proposes the image-capturing apparatus which further has an area-designating section for designating areas corresponding to at least one of the first and the second images in the finder so that the display-control circuit moves the images to the designated areas.

In the present invention, since the image-capturing apparatus further has the area-designating section for designating areas corresponding to at least one of the first and the second images in the finder so that the display-control circuit moves the images to the designated areas, the user can move the object image to be captured to desirable position.

The present invention proposes the image capturing apparatus which further has a capture-mode-selecting section for selecting one of a first-capture mode and a second-capture mode so that, as to whether or not the image having a first perspective angle and/or the image having the second perspective angle are stored in the memory apparatuses is determined in the first-capture mode; the image having the first perspective angle is displayed in the second-capture mode; and the second perspective angle of the image which has been determined previously to be stored in the first-capture mode is set in the second-capture mode. The display-control circuit further has a filtering section for filtering the image in accordance with the selected capture mode so that the image having the perspective angle not to be stored is filtered differently from the image which has been determined to be stored.

In the present invention, one of the first-capture mode and the second-capture mode is selected by the a capture-mode-selecting section so that, as to whether or not the image having a first perspective angle and/or the image having the second perspective angle are stored in the memory apparatuses is determined in the first-capture mode; the image having the first perspective angle is displayed in the second-capture mode; and the second perspective angle of the image which has been determined previously to be stored in the first-capture mode is set in the second-capture mode. Furthermore, the display-control circuit filters the image which has the perspective angle previously determined not to be stored in accordance with the capture mode so that the filtering of the image is different from the image determined to be stored. Therefore, an object image which is not stored in the memory apparatuses can easily be identified visually.

The present invention proposes the image-capturing apparatus which further has a display-size-designating section for designating a display size of at least one of the first and the second images so that the display-control circuit varies the display size of at least one of the first and second images in accordance with the designated display size.

In the present invention, since the image-capturing apparatus further has the display-size-designating section for designating the display size of at least one of the first and the second images so that the display-control circuit varies the display size of at least one of the first and second images in accordance with the designated display size, the user can vary the size of at least one of the object image desirably in order to identify the object image visually.

The present invention proposes the image-capturing apparatus in which the display-control circuit varies the display size if the display size designated by the display-size-designating section exceeds a predetermined threshold.

In the present invention, since the display-control circuit varies the display size if the display size designated by the display-size-designating section exceeds a predetermined threshold, i.e., the display size within the threshold is varied, it is possible to visually identify the display size which is greater than the threshold from the display size which is within the threshold.

The present invention proposes the image-capturing apparatus in which the display-control circuit displays a frame which indicates an outline of one of the first and the second images so that one of the images contain the other image; and the frame indicates an outline of the contained image.

In the present invention, since the display-control circuit displays the frame which indicates the outline of one of the first and the second images so that one of the images contain the other image, the frame indicating the outline of the contained image, the user can identify the contained image from the containing image, i.e., a fill image in the finder before capturing the object image.

The present invention proposes the image-capturing apparatus in which the display-control circuit differentiates property belonging to the full image from property belonging to the contained image.

In the present invention, since the display-control circuit differentiates the property belonging to the full image from the properties belonging to the contained image, the user can identify the contained image from the full image in the finder before capturing the object image.

The second aspect of the present invention provides an image display apparatus which has: an optical system imparting distortion to an object image to be captured in which the distortion is imparted so that a central portion of the object image is magnified and a peripheral portion of the object image is reduced; an image sensor having an image-capturing elements having s receiving surface for converting the object image which is focused onto the receiving surface into initial image data including the distortion, and outputting thereof; an image-processing circuit for generating first image data having a first perspective angle established corresponding to the initial image data and a second image data having a second perspective angle which is different from the first perspective angle by compensating the distortion included in the initial image data having the established perspective angles so that the second image data is established corresponding to the initial image data; two display panels for displaying images corresponding to the first and second image data; and a display-control circuit for displaying an image corresponding to the first image data in whichever one of the display panels and an image corresponding to the second image data on the other one of the display panels.

In the present invention, since the first image based on the first image data and the second image based on the second image data are displayed in the displays separately, it is possible to display the image in the display effectively, i.e., one-image-in-one-display does not make blank portions in either display.

The present invention can realize an effect in that both the wide-angle image and the telescopic image can be displayed in the finder clearly so that the interpolation is conducted at a minimum, and deterioration of the electronically-zoomed image can be prevented.

In addition, the present invention can propose the image-displaying apparatus suitable for displaying images corresponding to a plurality of perspective angles by interpolating and/or compensating distortion contained in the images compressed by the optical system.

BRIEF DESCRIPTION OF THE DRAWINGS

FIGS. 15A and 15B are examples for two kinds of images, i.e., a wide-angle view and a telescopic view shown in the finder.

FIGS. 16A and 16B show how a telescopic view is produced by a conventional electric zooming function.

DETAILED DESCRIPTION OF THE INVENTION

First Embodiment

First embodiment of the image-capturing apparatus in accordance with the present invention is explained below in detail with reference to the drawings.

Figure 1:
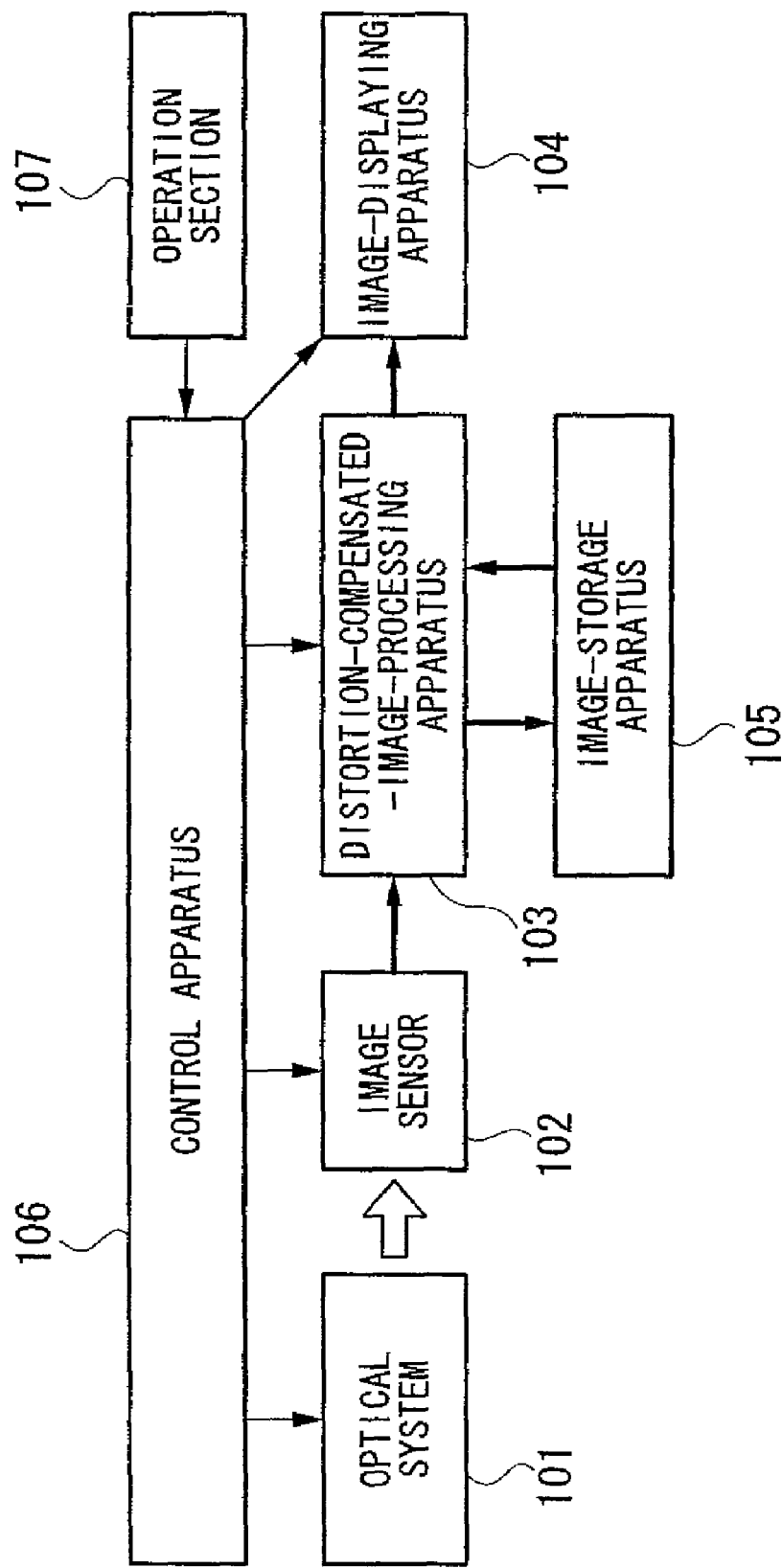
FIG. 1 shows a diagram of the image-capturing apparatus in accordance with embodiments of the present invention.

FIG. 1 is shows a diagram of the image-capturing apparatus, e.g., a digital camera system in accordance with the first embodiment of the present invention. As shown in FIG. 1, the image capturing apparatus in accordance with the present embodiment has: an optical system 101 which imparts distortion, equivalent to the optical system imparting distortion to an object image to be captured so that a central portion of the object image is magnified and a peripheral portion of the object image is reduced; an image sensor 102; a distortion-compensated-image-processing apparatus 103, equivalent to the image-processing circuit; an image-displaying apparatus 104, equivalent to the finder; an image-storage apparatus 105; a control apparatus 106, equivalent to the display-control circuit; and an operation section 107, equivalent to the area-designating section and the display-size-designating section.

Figure 2B:
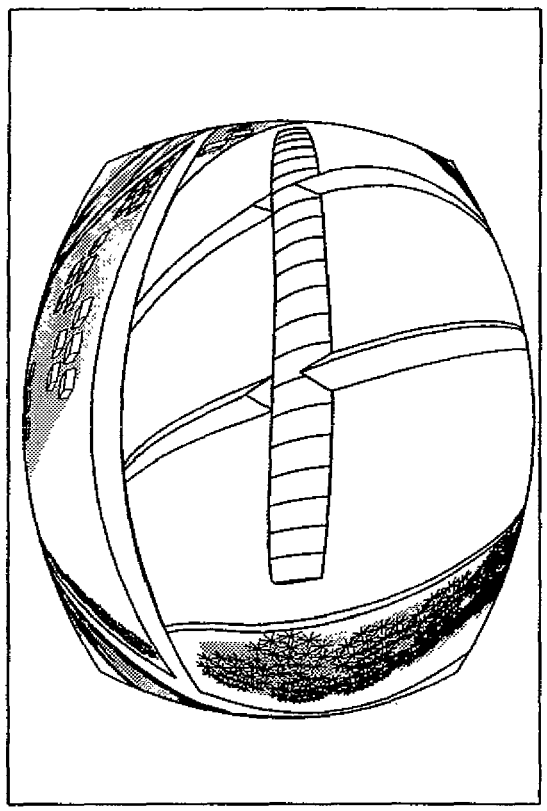
FIGS. 2A and 2B show examples of images captured by the optical system which can impart distortion to an object image-to-be-captured.
Figure 2A:
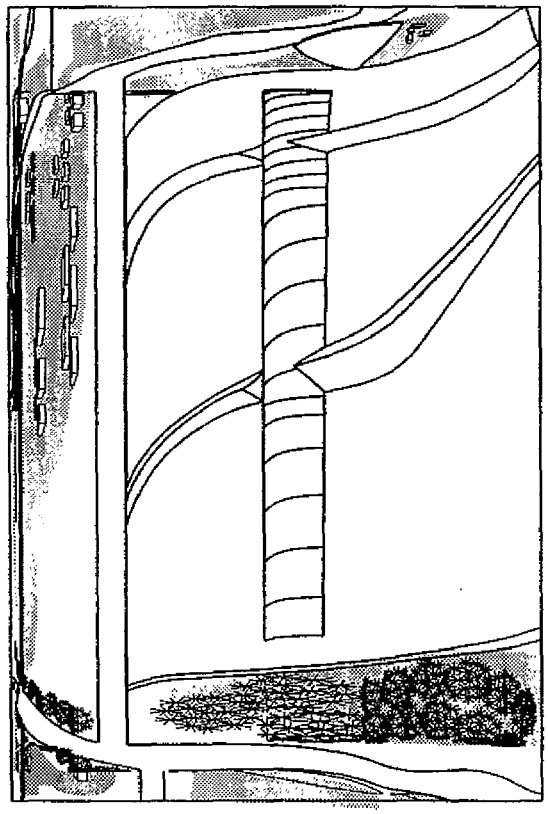

FIGS. 2A and 2B show examples for images captured by the optical system 101 which imparts distortion to an object image-to-be-captured. FIG. 2A shows an example for an image captured by the optical system which imparts distortion to an object image to be captured so that a peripheral portion of the object image is reduced so that the reduction is more eminent farther from the central portion of the object image; and that the reduction is independent with respect to a horizontal member and a vertical member of a rectangle window of the finder. The object image is captured by the optical system shown in FIG. 21. FIG. 2B shows an example of an image captured by the optical system having co-axial lens elements which imparts barrel-shaped distortion to an object image to be captured so that a peripheral portion of the object image is reduced so that the reduction is more eminent farther from the central portion of the object image; and that the reduction is concentric.

The image sensor 102 is a photoelectric-converting element, e.g., a Charge-Coupled-Device (CCD) sensor and a Complementary Metal Oxide Semiconductor (CMOS) sensor for converting the object image optically captured by the distortion-imparting optical system 101 into an electric signal. The distortion-compensated-image-processing apparatus 103 converts the electric signal output from the image sensor 102 into an image signal having suitable format used for display and data-compression. Also, the distortion-compensated-image-processing apparatus 103 conducting image-processing in order to compensate the distortion; and obtaining a high-quality image; and for compresses the converted signal for storing the processed images.

The image-displaying apparatus 104 is, e.g., a liquid crystal display for displaying images. The image-storage apparatus 105 is a storage device, e.g., a semiconductor memory and a magnetic memory for storing captured images. The control apparatus 106 controls the optical system 101, the image sensor 102, the distortion-compensated-image-processing apparatus 103, and the image-displaying apparatus 104. The operation section 107 includes: buttons; switches; and an information display, for a user to operate the camera.

The distortion-compensated-image-processing apparatus 103 is explained below with reference to FIG. 3.

The image-capturing apparatus and displaying method according to the present embodiment are characterized in using the image-displaying apparatus 104 which converts an image having distortion into a zoomed image free of the distortion in view of visibility of such distortion-free images. Therefore, a detailed explanation of the data storage and the data compression is omitted.

Figure 3:
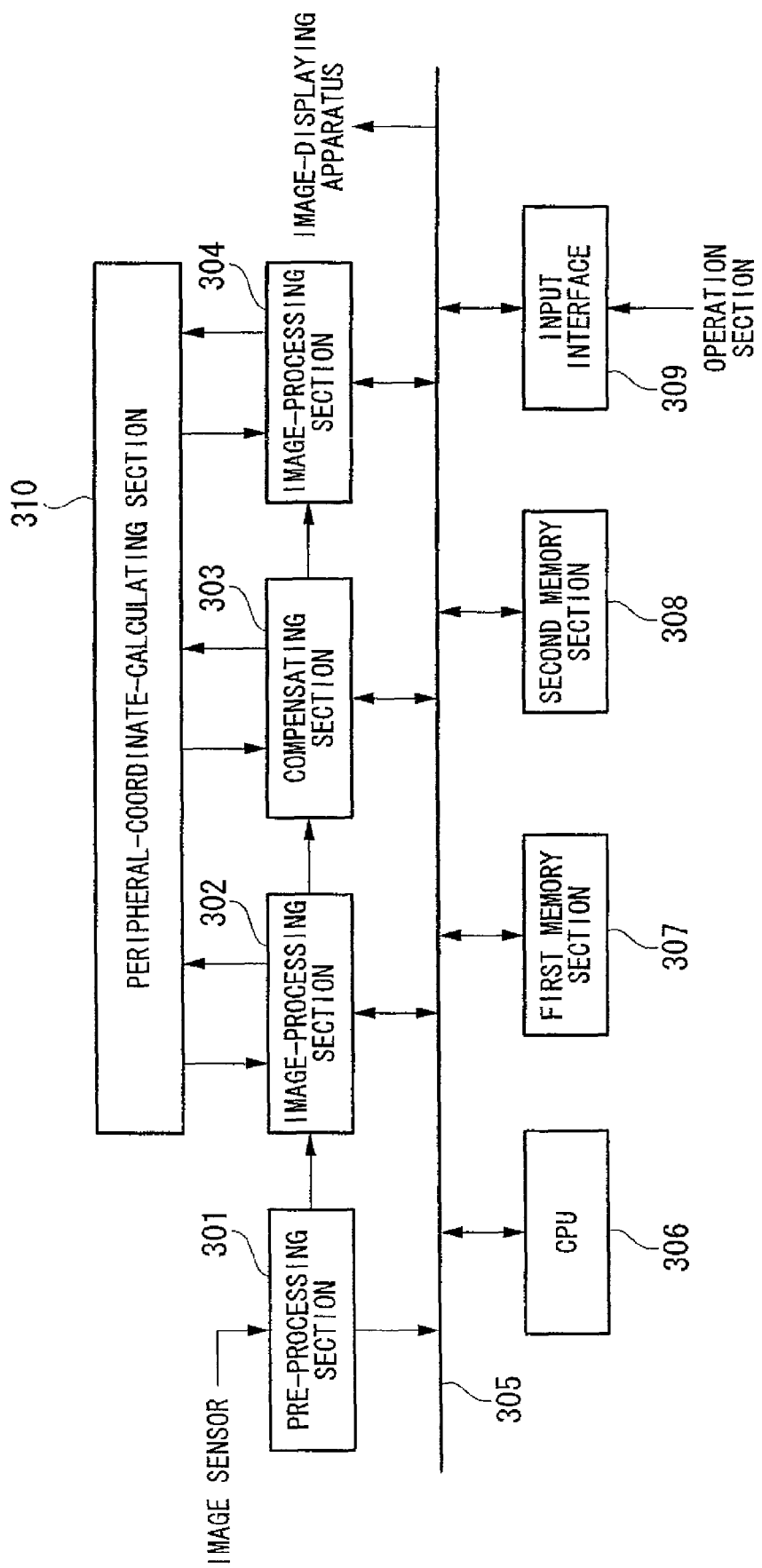
FIG. 3 is a schematic diagram showing a distortion-compensated-image-processing apparatus.

As shown in FIG. 3, the distortion-compensated-image-processing apparatus 103 has: a pre-processing section 301; a first image-processing section 302; a second image-processing section 304; a distortion-compensating section 303; a bus 305; a first memory section 307; a second memory section 308; and an input-interface 309. The pre-processing section 301 obtains image data from the image sensor 102; and converts the obtained image data into a digital signal by an analogue front end circuit (e.g., a cadmium sulphide semiconductor (CDS), a pin-grid-array (PGA), and analogue/digital (A/D) converter, not shown in the drawing).

The first image-processing section 302 carries out shading compensation (i.e., luminosity compensation) and RGB synchronization. The shading compensation eliminates undesirable results, e.g., increased luminosity due to the distortion, imparted by the optical system shown in FIGS. 2A and 2B, in which the peripheral portion of the object is compressed; and decreased luminosity due to lens barrel blocking light which comes into the lens unit from non-axial directions. After the shading compensation, Bayer data is obtained. The obtained Bayer data is converted into color data in the RGB synchronization. In ordinary cases, the color data is generated by interpolating pixels disposed around a pixel corresponding to the obtained Bayer data in the RGB synchronization.

The interpolation carried out in the present embodiment is explained below specifically with reference to FIGS. 4A and 4B. Since each data indicated by reference numerals 401 to 409 has red color data (R), green color data (G) and blue color data (B), the explanation below and "402(G) in FIGS. 4A and 4B" are consistent.

With respect to the red color, color data 402(R) is generated by interpolating color data 401(R) and color data 403(R). Similarly, color data 404(R) is generated by interpolating color data 401(R) and color data 407(R). Although the interpolated color data can be obtained by calculating an average of the adjacent two color data unless the optical system has distortion, the obtained Bayer data has distortion imparted by the optical system as shown in FIG. 4A. Therefore, the interpolated color data is obtained by sampling and equalizing the distortion by using the image sensor in the present embodiment.

Figure 4B:
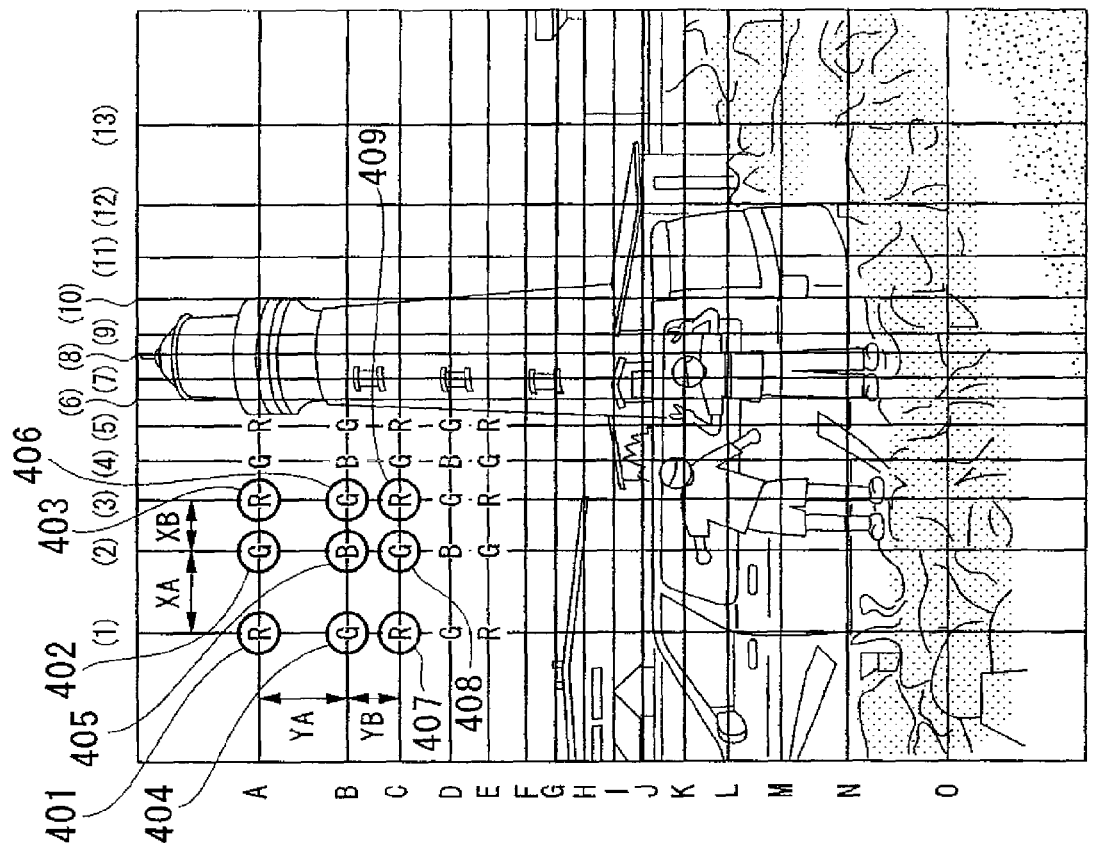
FIGS. 4A and 4B show an interpolating method used in RGB synchronization.
Figure 4A:
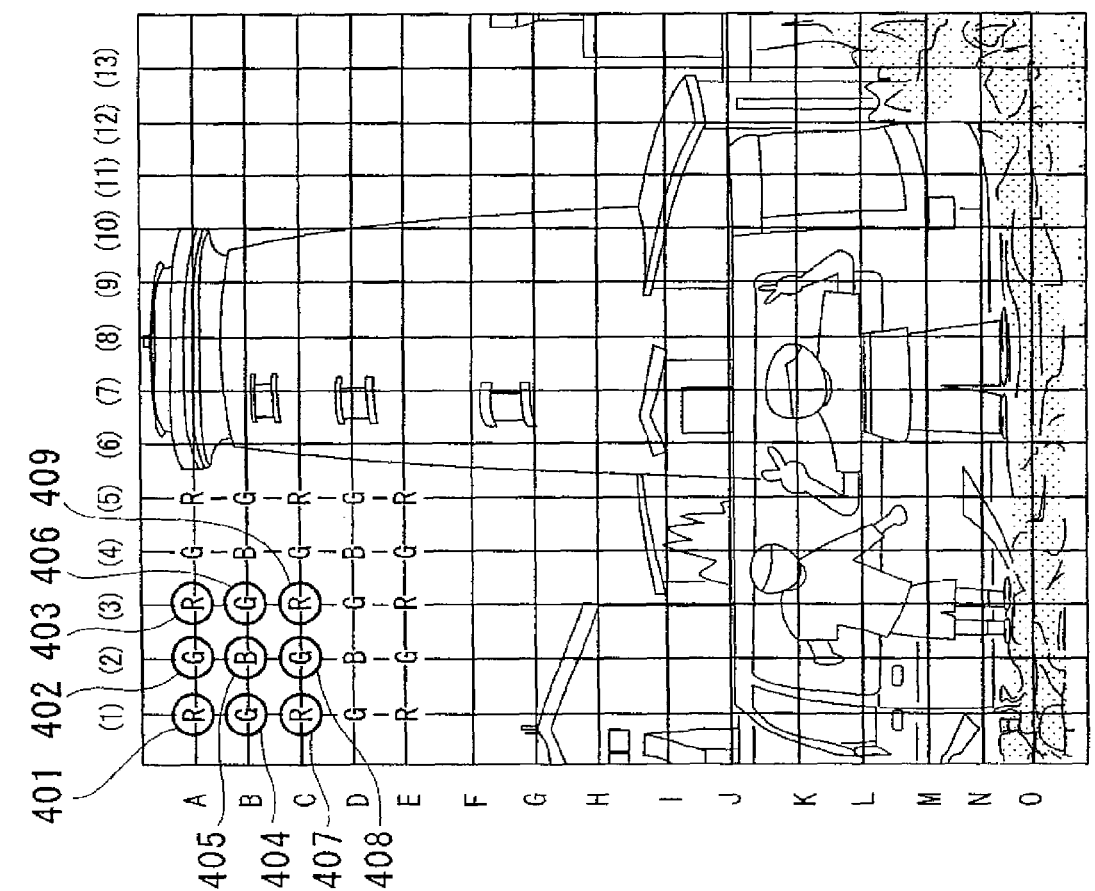

Accordingly, the distortion-compensated image is shown in FIG. 4B, i.e., corresponding to an object image, e.g., a landscape actually visible to the human eye where coordinates of the obtained interpolated color data are not disposed by an equal interval. In FIGS. 4A and 4B, vertical grid lines (1) to (13) indicate grid of the coordinates formed on the vertical directions of the object with an equal interval and horizontal grid lines (A) to (O) indicate grids of the coordinates formed on the horizontal direction of the object with an equal interval. Therefore, color data indicated by the same reference symbol between FIGS. 4A and 4B are the same.

High-quality interpolation requires that the intervals of these cross points on the coordinates be compensated in accordance with intervals of the corresponding intervals of the visible landscape (distortion-compensated image). The color data 402(R) is generated from the color data 401(R) and the color data 403(R) by the following interpolation:

Color Data 402(R)=((Color Data 401(R)×(XB/(XA+XB)))+((Color Data 403(R)×(XA/(XA+XB)))

where XA indicates the interpolated distance between color data 401(R) and color data 403(R); XB indicates the interpolated distance between color data 403(R) and color data 402(R).

Similarly, the color data 404(R) is generated by the following interpolation:

Color Data 404(R)=((Color Data 401(R)×(YB/(YA+YB)))+((Color Data 407(R)×(YA/(YA+YB)))

Other color data corresponding to (R), (G), and (B) can be generated in similar manner.

The above examples are interpolation conducted between two cross points. As far as color data (G) is concerned, higher-quality interpolation requires four adjacent cross points. The interpolation with respect to color data (G) may be carried out similarly by the following interpolation:

$$\begin{aligned}\text{Color Data } 405(G) = &((\text{Color Data } 404(G) \times (XB/(XA+XB))) + \\&((\text{Color Data } 406(G) \times \\&(XA/(XA+XB)))/2) + \\&((\text{Color Data } 402(G) \times (YB/(YA+YB))) + \\&((\text{Color Data } 408(G) \times (YA/(YA+YB)))/2)\end{aligned}$$

i.e., the four adjacent pixels may be weighted in an inverse proportion with respect to the intervals of the cross points corresponding to the distortion-compensated object image.

The color data (R) and (B) can be generated by combining calculation results obtained from the two-point interpolations. The color data (R) and (B) can also be generated by interpolating cross points disposed diagonally, i.e., not horizontally or vertically around the interpolated color data.

The color data obtained by the RGB synchronization is subjected to spatial filters before compensating the distortion. These spatial filters are low-pass filters for preventing deterioration of image quality because the distortion compensation, i.e., magnifying the central portion of the object image decreases the high-frequency component. Capacity of these low-pass filters must be a variable in accordance with perspective angles, i.e., zoom positions corresponding to object image desirable to the camera user.

Figure 5:
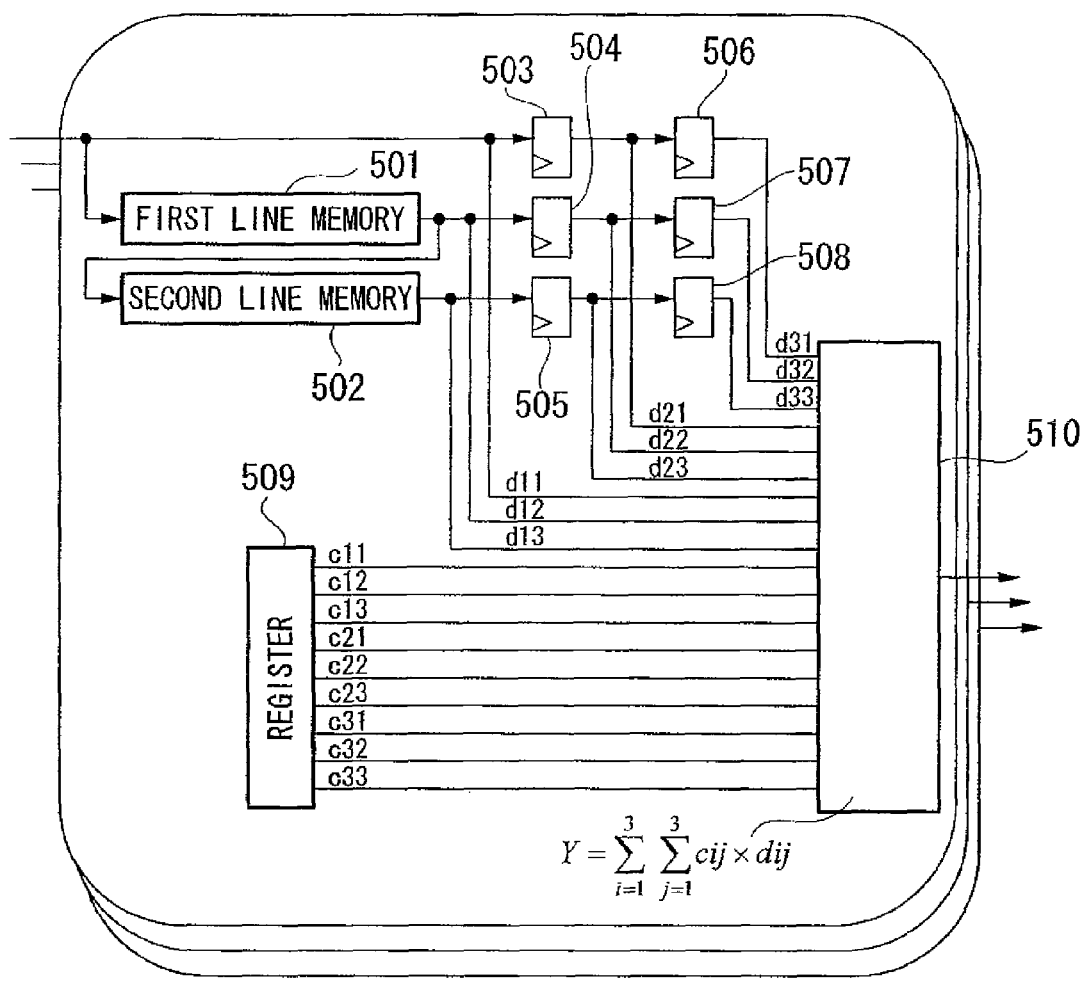
FIG. 5 shows a schematic diagram of spatial filters.
Figure 6:
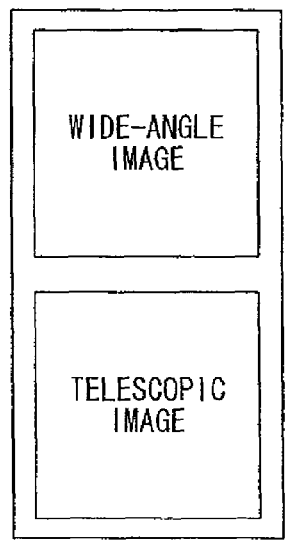
FIG. 6 shows a view showing how image data is contained in the memory apparatuses.

FIG. 5 shows an example of a configuration of spatial filters having 3×3 size. In this apparatus, at first, matrix data d11 to d33 having 3×3 size are generated in memories 501, 502, and flip-flops 503 to 508 for storing image data corresponding to a pixel. Consequently, the following calculation is carried out in a product-sum computing circuit using the coefficients C11 to C33.

$$Y = \sum_{i=1}^{3} \sum_{j=1}^{3} cij \times dij$$

Here, Y indicates an output result of a central pixel of 3×3 disposition, and it is possible to obtain effects of desirable filters, e.g., low-pass filters by carrying out these processes. In the example shown in FIG. 5, each coefficient is adjustable independently in view of undesirable results caused by the distortion. In order to reduce the size of the circuit including the spatial filters, if the image quality can be compromised to some extent, i.e., if the affection caused by the distortion can be ignored, the circuit may be formed by including lesser sets of multipliers than the previously-required sets of multipliers. In such a case, two color data of horizontally-disposed pixels, disposed symmetric with respect to the pixel corresponding to a color data-to-be-calculated, are added. Similarly, two color data of vertically-disposed pixels, disposed symmetrically with respect to the pixel corresponding to the color data-to-be-calculated, are added. After that, common coefficients are multiplied to the obtained color data.

If the distortion is so great that the central portion of the object image is magnified unexpectedly, the size of the circuit must be greater, e.g., the circuit may be formed by spatial filters having a 4×4-disposition or a 5×5-disposition. In the present invention, disposition of the filters may not be limited to a matrix disposition explained in the present embodiment. The capacity of the low-pass filters in accordance with the present embodiment may be variable in accordance with the zoom positions, i.e., the perspective angle of the object image desirable to the camera user indicated by the operation signals output from an operation section 107.

Each image data, i.e., the color data corresponding to each R, G, and B obtained by the above filtering in accordance with the zoom position, are input into a distortion-compensating section 303 independently. The color data obtained through a block of spatial filters, i.e., the spatial filters having matrix disposition are stored in the first memory section 307, i.e., not to be sent to a distortion-compensating section 303 or the second image-processing section 304 which will to be explained later.

The distortion-compensating section 303 compensates the distortion included in the image data obtained by the first image-processing section 302. In addition, the distortion-compensating section 303 magnifies and/or reduces the distortion-compensated image data. An example for a specific method for obtaining a pixel 701 by compensating the distortion is explained below with reference to FIGS. 7A to 7C.

Figure 7:
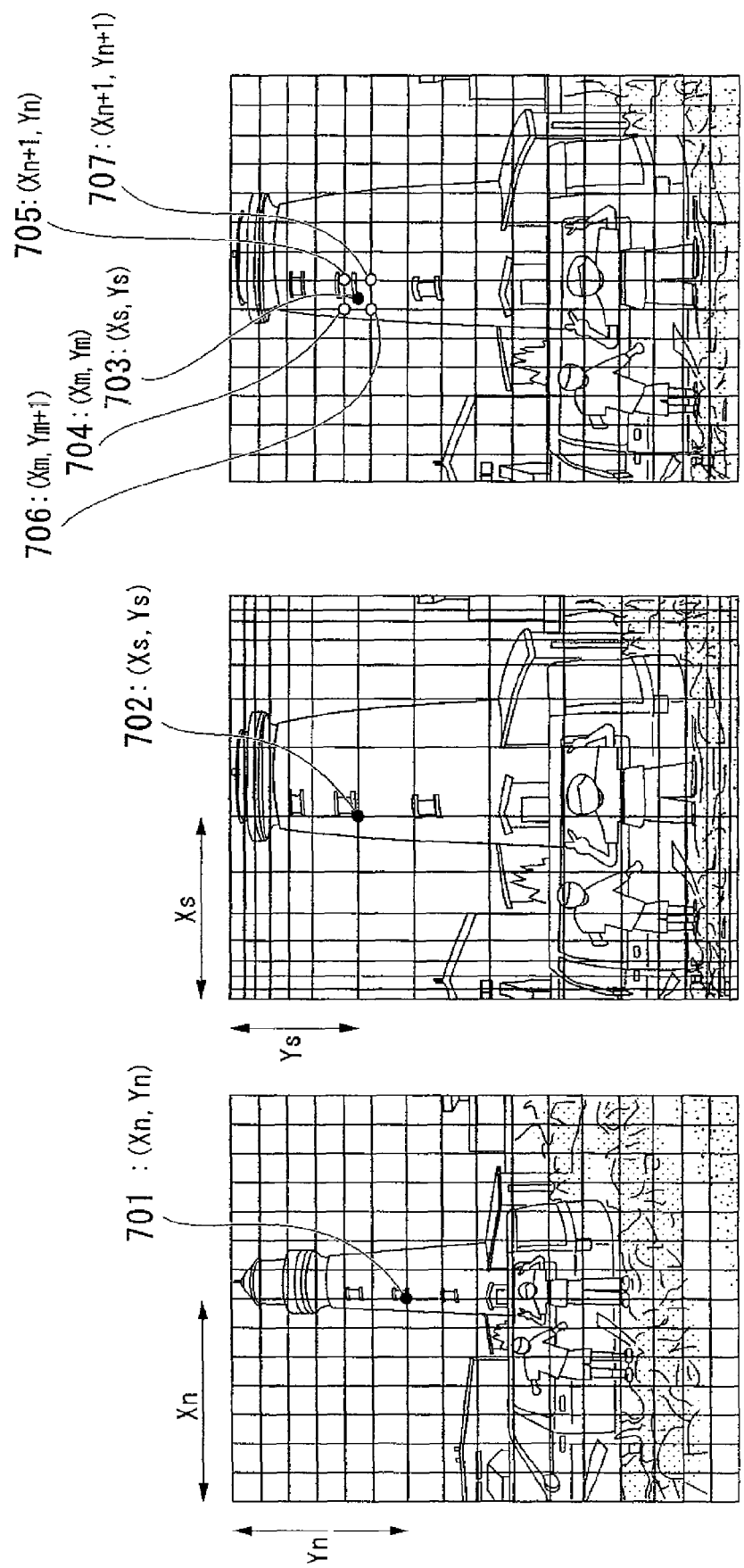
FIGS. 7A to 7C show how the distortion is compensated.

FIG. 7A shows a distortion-compensated object image. Pixel data corresponding to cross points of vertical and horizontal grid lines are calculated in the distortion compensation. A coordinate (Xs, Ys), corresponding to the coordinate of pixel 701 having the distortion and chromatic aberration of magnification, is calculated. The coordinate (Xs, Ys) is shown as 702 in FIG. 7B.

Each grid line in FIG. 7A corresponds to each grid line in FIG. 7B. The grid lines in FIG. 7B indicate that the object image has the distortion in which the central portion is magnified and the peripheral portion is reduced. Although, in appearance, the position of the pixel 702 deviates from the position of the distortion-compensated pixel, it should be understood that the pixel 701 and the pixel 702 indicate the same color data. However, as shown in FIG. 7C, an object image having distortion captured actually by the image sensor 102 has color data corresponding to cross points of grid lines disposed by an equal interval horizontally and vertically. These cross points do not indicate the pixels 701 and 702 as shown in FIGS. 7A and 7B.

Accordingly, a coordinate of pixel 703 is calculated from peripheral coordinate data, corresponding to pixels 704 to 707 disposed around the pixel 703 and stored in the peripheral-coordinate-calculating section 310, by an interpolation method, e.g., a linear-interpolation method.

Figure 8:
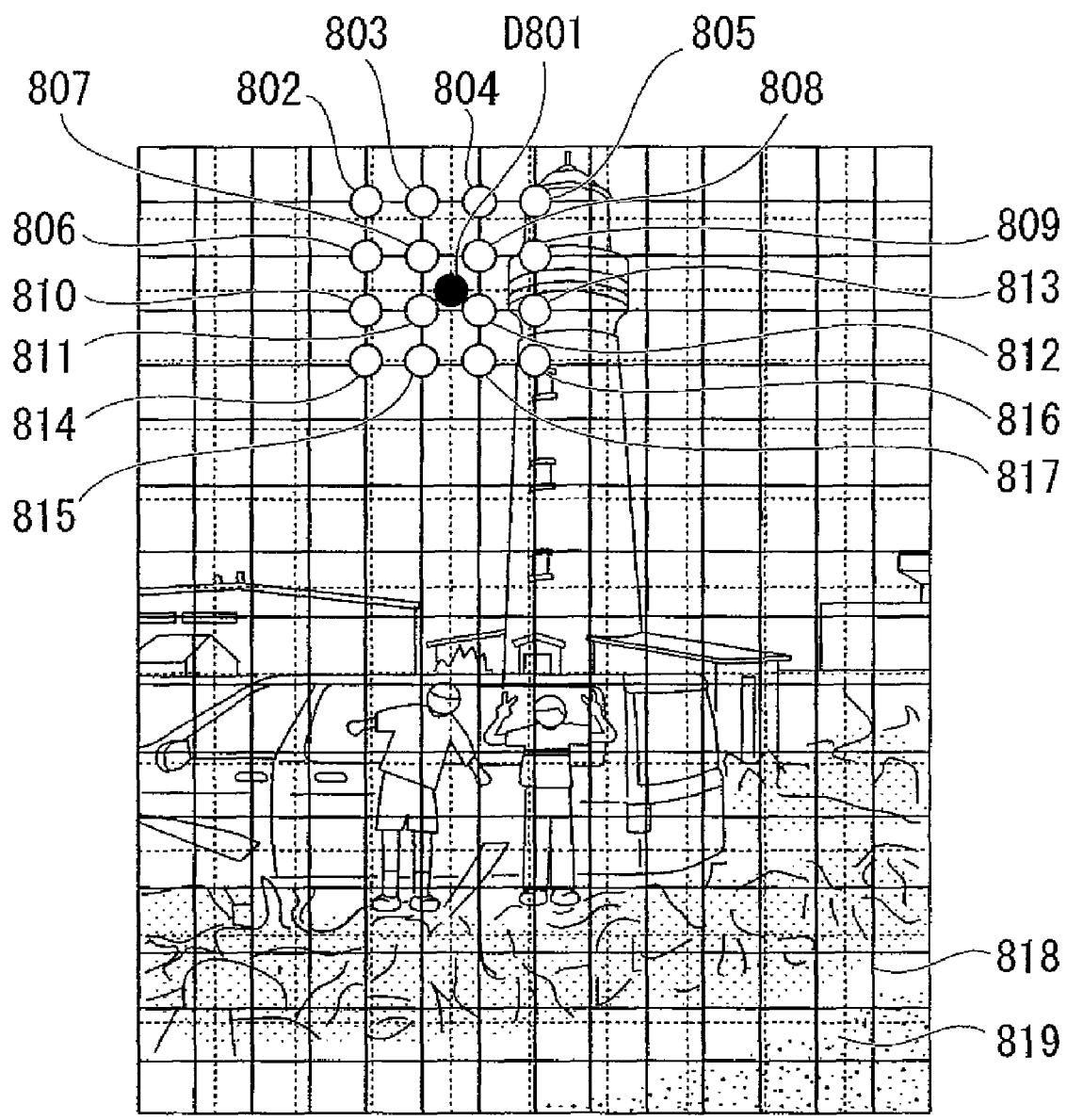
FIG. 8 shows a view for explaining how the object image is magnified and/or reduced.

The magnification and/or reduction are explained with reference to FIG. 8. In the drawing, cross points on horizontal and vertical continuous grid lines 818 indicate positions of pixels, i.e., the color data stored in the first memory section 307. Cross points on horizontal and vertical dot-grid lines 819 indicate positions of pixels, i.e., the color data used for the reduction.

A coordinate of the pixel D801 on a cross point of the dot-grid lines 819 can be calculated by the peripheral-coordinate-calculating section 310 so that the calculated coordinate is converted to a coordinate corresponding to the cross point of the continuous grid lines 818 corresponding to the data stored in the first memory section 307. In addition, sixteen coordinates disposed around the pixel 801 are calculated. The color data of the pixels corresponding to these calculated coordinates are read out from the first memory section 307. Consequently, the interpolation is carried out in accordance with the following formula where C802 indicates a coordinate of a pixel on a cross point of the continuous grid lines 818.

$$D801 = C802 \times D802 + C803 \times D803 + C804 \times D804 + C805 \times$$
$$D805 + C806 \times D806 + C807 \times D807 + C808 \times D808 +$$
$$C809 \times D809 + C810 \times D810 + C811 \times D811 + C812 \times$$
$$D812 + C813 \times D813 + C814 \times D814 + C815 \times D815 +$$
$$C816 \times D816 + C817 \times D817 \text{ where } C802 + C803 + \ldots +$$
$$C817$$
$$= 1.0$$

The present invention is not limited to the above interpolation, i.e., the nearest pixel may replace the above calculation, or coordinates of the nearest four pixels are interpolated by using the linear interpolation method.

The second image-processing section 304 serves as spatial filter for filtering the image data, e.g., the color data magnified and/or reduced in the distortion-compensating section 303. Such filters are, e.g., edge-enhancement filters for restoring quality of the image having resolution deteriorated due to the magnification of the peripheral portion of the image, and noise-reduction filters for preventing the deterioration of the image quality due to enhanced noise.

Capacity of the filters is variable in accordance with desired perspective angles because it is not desirable for the camera user if only the magnified peripheral portion has a blurred phase while the central portion is reduced, i.e., the central portion has high resolution. Another reason for the variable capacity of the filters is that the noise component stands out only in the peripheral portion of the object image while the noise component has decreased in the reduced central portion. Therefore, the central portion of the object image does not have to be subject to the same level of edge-enhancement or noise-reduction as those carried out in the peripheral portion.

Such filtering structure can be realized by the filters shown in FIG. 5 which can serve as the edge-enhancement filters having adjustable coefficients C11 to C33. The coefficients C11 to C33 stored in the memory sections must be variable in accordance with the position of the pixels, i.e., coordinate of the pixels. In the example shown in FIG. 5, each coordinate is adjustable independently in view of undesirable results caused by the distortion. In order to reduce the size of the circuit including the spatial filters, if the image quality can be compromised to some extent, i.e., if the undesirable results caused by the distortion can be ignored, the circuit may be formed by including lesser sets of multipliers than the previously-required sets of multipliers. In such a case, two color data of horizontally-disposed pixels, disposed symmetric with respect to the pixel corresponding to a color data-to-be-calculated, are added. Similarly, two color data of vertically-disposed pixels, disposed symmetric with respect to the pixel corresponding to the color data-to-be-calculated, are added. After that, common parameters are multiplied to the obtained color data.

If the distortion is so great that the peripheral portion of the object image is magnified unexpectedly, the circuit having greater size may be capable of improving the quality of the object image, e.g., the circuit may be formed by spatial filters having 4×4-disposition or a 5×5-disposition. In the present invention, disposition of the filters may not be limited to a matrix disposition explained in the present embodiment. In the present embodiment, the capacity of the low-pass filters may be variable in accordance with the zoom positions, i.e., the perspective angle of the object image desirable to the camera user based on operation signals output from an operation section 107. The quality-restored telescopic and wide-angle images obtained through a block of spatial filters, i.e., the spatial filters having matrix disposition are stored in the second memory section 308.

A bus 305 is a data transmission path which transmits data used for carrying out the display of object image sequentially. The CPU 306 carries out various function such as, receiving the operation signals from the input-interface 309; calculating coefficients-to-be-updated and parameters-to-be-updated; and transmitting the updated coefficients and parameters to the first image-processing section 302, the distortion-compensating section 303, and the second image-processing section 304.

Image data obtained from the pre-processing section 301 or the image data having the distortion, having previously experienced the shading compensation and RGB synchronization, is stored in the first memory section 307. The second memory section 308 stores the image data obtained from the second image-processing section 304. Furthermore, these memory sections store the image data in accordance with as to whether the image data corresponds to the wide-angle image or the telescopic image. These image data stored temporarily in these memory sections are transmitted to the image-displaying apparatus 104 which displays the object image.

The input-interface 309 receives the operation signal from the operation section 107 and transmits the operation signal to the CPU 306 via the bus 305.

The peripheral-coordinate-calculating section 310 calculates the coordinates of pixels corresponding to the object image having distortion-to-be-compensated. The calculation is carried out in accordance with the image data stored in the first memory section 307. After that, the peripheral-coordinate-calculating section 310 transmits the calculated coordinate data to the distortion-compensating section 303 and the second image-processing section 304.

As explained above in order to obtain a desirable zoomed image, the distortion-compensated-image-processing apparatus 103 converts the coordinates of pixels corresponding to the object image having the distortion; and produces a wide-angle image and a telescopic image by compensating the distortion in contrast to a conventional electric zoom in which a whole object image is compensated. Therefore, a deterioration-prevented-and-high-resolution object image is transmitted to the image-displaying apparatus 104 as explained later.

Figure 9:
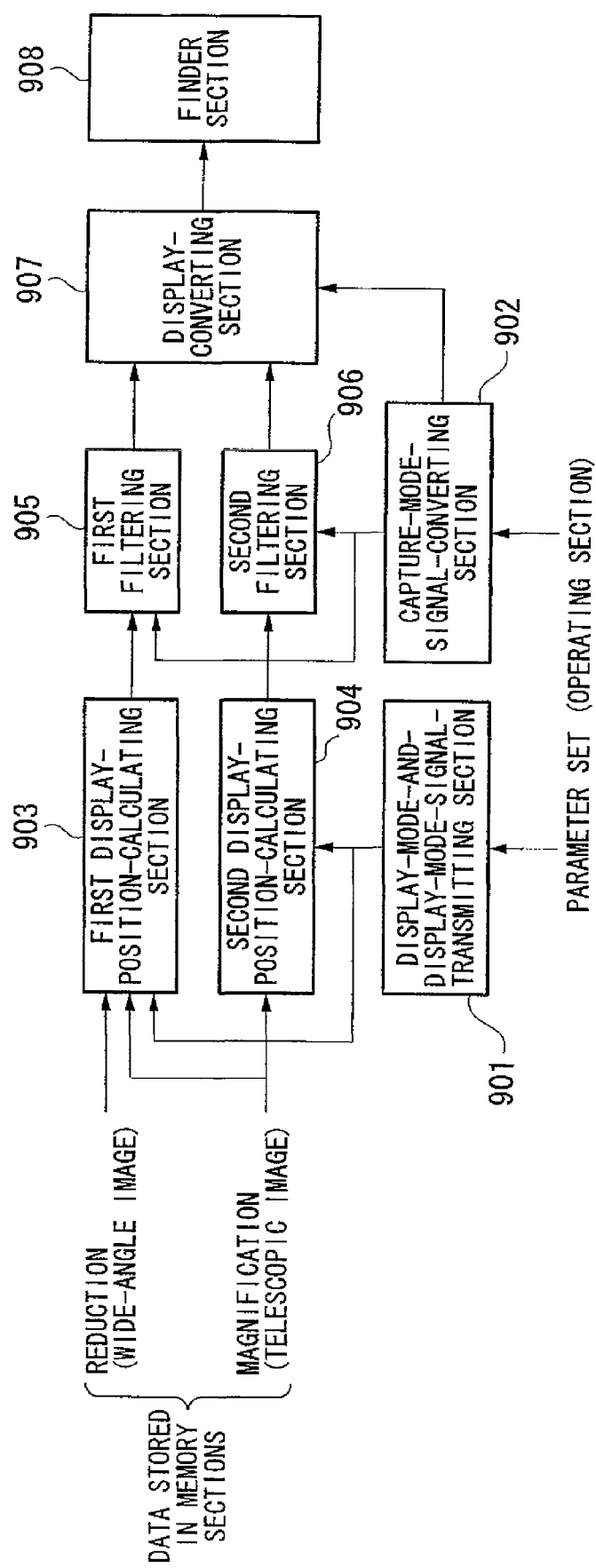
FIG. 9 is a schematic diagram showing the image-displaying apparatus.

The image-displaying apparatus 104 is explained below with reference to FIG. 9. As shown in FIG. 9, the image-displaying apparatus 104 has: a display-mode-and-frame-transmitting-signal converting section 901; a capture-mode-signal-converting section 902, equivalent to the capture-mode-selecting section; a first display-position-calculating section 903; a second display-position-calculating section 904; a first and second filtering sections 905, 906; a second filtering section 906; a display-converting section 907; and a finder section 908.

Figure 10:
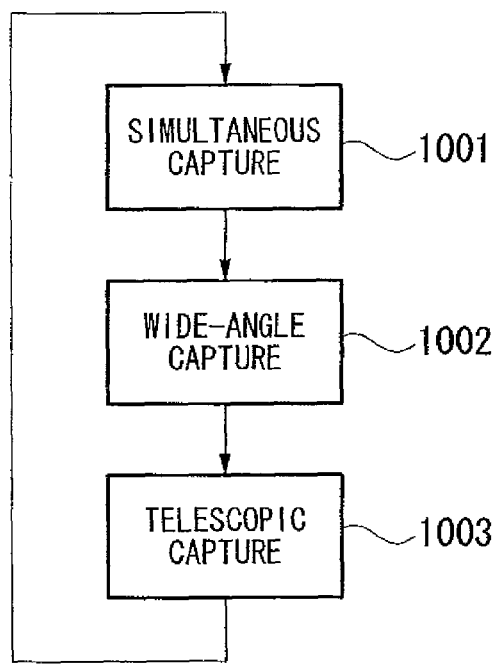
FIG. 10 is a flow chart of the capture modes.

The display-mode-and-frame-transmitting-signal converting section 901 receives signals relating to the display mode and the displayed frame from the operation section 107, and transmits the received signals to the first display-position-calculating section 903 and the second display-position-calculating section 904. The capture-mode-signal-converting section 902 receives signals relating to the display mode selected by the operation section 107, and transmits the selected signals to the first and second filtering sections 905, 906. The display mode is switched in accordance with a flow chart shown in FIG. 10. Both the wide-angle image and the telescopic image can be captured in the synchronous capture mode 1001. Only the wide-angle image can be captured in the wide-angle capture mode 1002. Similarly, only the telescopic image can be captured in the telescopic capture mode 1003.

The first display-position-calculating section 903 receives the signals from the display-mode-and-frame-transmitting-signal converting section 901, and calculates, i.e., converts coordinate of pixels corresponding to the magnified object image and reduced image. The second display-position-calculating section 904 carries out the same conversion. Two kinds of image data, e.g., telescopic images based on magnified object images, and wide-angle images based on reduced object images are input into the first display-position-calculating section 903 because the magnification ratio, i.e., indicated by the perspective angle of the telescopic image/perspective angle of the wide-angle image must be calculated; and the telescopic image must be indicated by a frame disposed in the wide-angle image.

The size of the image, e.g., the magnified object image and the reduced object image produced by the distortion-compensated-image-processing apparatus 103 is greater than the size of the object image displayed in a display panel, e.g., a liquid crystal finder.

For example, the magnified object image or the reduced object image has several millions of pixels. In contrast, the display panel of the liquid crystal finder has several hundreds thousands of pixels. Therefore, coordinates of pixels in the image data must be converted to be displayed in the display panel of the liquid crystal display. The frame used in the finder is explained later.

The first and second filtering sections 905, 906 receive the signal converted in the capture-mode-signal-converting section 902, and carry out a specific arrangement to the zoomed image, i.e., telescopic image if the telescopic capture mode 1003 is not in effect. In accordance with the specific arrangement of the present embodiment, the colored telescopic image is displayed in the finder if the telescopic capture mode 1003 is in effect. In contrast, if the telescopic capture mode 1003 is not in effect, only edge lines of the telescopic image are displayed (hereinafter, called edged image). A translucent area corresponding to the telescopic image may be displayed in the wide-angle image (hereinafter called a translucent image). By such a specific arrangement, the camera user is able to identify the capture mode.

The edged image can be obtained by edge-extracting filters for filtering the image data obtained from the present block, i.e., the first and second filtering sections 905, 906. The translucent image can be obtained by calculating the image data input into the present block, i.e., the first and second filtering sections 905, 906 in accordance with color included in a background area of the object image. The calculation is carried out in accordance with a formula below.

Translucent Image Color of Background area×α+Input Object Image Data×(1−α)

where α<1

The display-converting section 907 displays the telescopic image and the wide-angle image in the liquid crystal display in the finder section 908 in accordance with the calculation results obtained by the first display-position-calculating section 903, the second display-position-calculating section 904, the first and second filtering sections 905, 906, and the second filtering section 906. Since only a piece of the object image can be displayed in the liquid crystal display in the finder section 908, the present block, i.e., the display-converting section 907, converts the two kinds of object image obtained from the first and second filtering sections 905, 906 into one piece of object image; thus, the display-converting section 907 transmits the converted object image to the finder section 908. The menu can be displayed in the liquid crystal display in the finder section 908 by converting the two kinds of object image and the signals obtained from the capture-inode-signal-converting section 902 in the present block, i.e., the display-converting section 907. The object image produced by the display-converting section 907 is displayed in the finder section 908.

A method is explained below for displaying the two kinds of object image, i.e., the telescopic image and the wide-angle image in the liquid crystal display in the finder section 908.

The image data stored in the second memory section 308 is converted so as to be displayed in the image-displaying apparatus 104. Two kinds of object images, one where the image has been magnified and the other one where the image been reduced, must be stored in the second memory section 308. However, these two kinds of object images are different with respect to the filtering coefficient used in the calculation carried out during the coordinate conversion in the distortion-compensating section 303. Therefore, two kinds of zoom image cannot be obtained by a single channel of distortion-compensating section 303 simultaneously.

Therefore, in the present embodiment, a sequence of distortion compensation is carried out to each object image captured by a session of zooming. After the data of two kinds of object images is stored in the second memory section 308, this data is transmitted to the image-displaying apparatus 104. By doing this, two kinds of object image can be displayed in a liquid crystal display in the finder section 908. Alternatively, two sets of distortion-compensated-image-processing apparatus 103, one for magnification and the other for reduction, may be provided for transmitting two kinds of object images to the image-displaying apparatus 104 simultaneously. In the latter case, the time for displaying the two kinds of object images in the liquid crystal display in the finder section 908 can be shorter than the former case. However, the first case is not a problem because the time required for the simultaneous display in the former case is as long as the time required for adjusting the focus by the optical zoom lens.

As to how the two kinds of object images are displayed using a single channel is explained below.

With respect to the two kinds of object images, one is a wide-angle image which is transmitted to the first display-position-calculating section 903, and the other is a telescopic image which is transmitted to both the first display-position-calculating section 903 and the second display-position-calculating section 904. These object data are converted into an image; thus, the converted image is displayed in the liquid crystal display in the finder section 908. The object image displayed in the liquid crystal display in the finder section 908 can be magnified or reduced by the distortion-compensated-image-processing apparatus 103. Such magnification or reduction is carried out with respect to each zooming session.

In addition, the zooming ratio can be varied with respect to only one of the two kinds of object images. For example, if the wide-angle image is zoomed to telescopic perspective angle, the coordinate of pixels of the wide-angle image are magnified, and after that, the data stored in the second memory section 308 corresponding to the wide-angle image is updated. After the updating of the data, the image data corresponding to the wide-angle image and the telescopic image stored in the second memory section 308 are converted in accordance with the foregoing explanations. Thus, the zooming ratio can be varied with respect to only one of the two kinds of object images.

The zoomed and captured object image displayed in the image-displaying apparatus 104 is stored in the image-storage apparatus 105. By doing this, the wide angle image and the telescopic image can be displayed simultaneously. In addition, with respect to the two kinds of object images, the camera user is able to recognize focus, depth of field, and composition in the finder section 908 accurately. Therefore, various mistakes can be prevented, e.g., blurring of an object to be captured, defocusing, and missing of the intended object in the captured image.

Figure 11A:
FIGS. 11A and 11B are examples for two kinds of images, i.e., a wide-angle view and a telescopic view shown in a liquid-crystal finder.
Figure 11B:
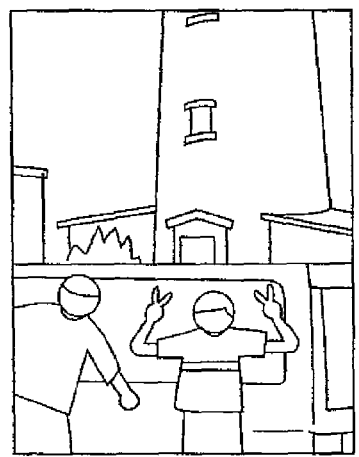

With respect to displayed position, the coordinates are calculated separately, i.e., the coordinates of displayed positions, e.g., the wide-angle image, the telescopic image, and the menu. By doing this, various layout of the images including the arrangement shown in FIGS. 11A and 11B can be displayed in the liquid crystal display in the finder section 908.

Examples for the arranged layouts using the image-capturing apparatus of the present embodiment are explained below.

Figure 12A:
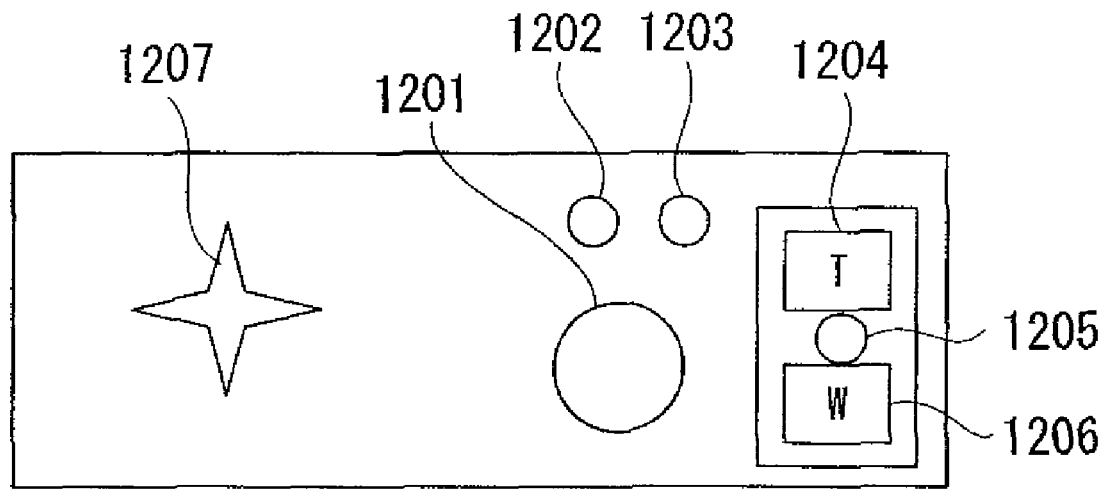
FIGS. 12A and 12B show views of operation sections.
Figure 12B:
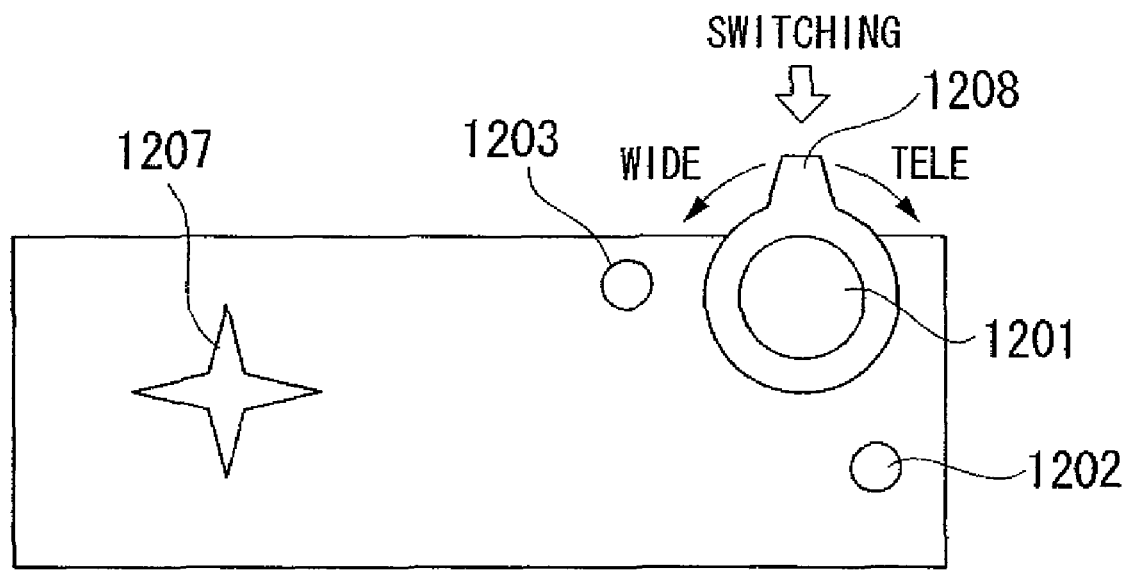

An operation section 107 has a user interface as shown in FIG. 12A or 12B. The operation section 107 shown in FIG. 12A has: a shutter button 1201 for capturing an object image; a display-mode button 1202 for switching display modes shown in a display panel in the finder; a capture-mode button 1203 for switching capture modes; a Wide button 1206 for zooming to a wide-angle; a Tele button 1204 for zooming to a telescopic angle; a Tele/Wide switching button 1205 for switching images between the wide-angle image and the telescopic image if the telescopic capture mode 1003 is in effect; and a frame-moving key 1207 for moving a frame shown in the finder.

Also, the operation section 107 shown in FIG. 12B is the same as that shown in FIG. 12A except for a zooming method for zooming to the wide-angle or to the telescopic angle; and a method for switching the zoomed images, i.e., the lever 1208 shown in FIG. 12B switches the zoomed images while zoomed images are switched using two buttons as shown in the case of FIG. 12A. Operations conducted using the operation section 107 are converted to operation signals by the control apparatus 106. The converted signals are transmitted to the input-interface 309 in the distortion-compensated-image-processing apparatus 103. Furthermore, these operation signals are transmitted from the input-interface 309 to the CPU 306 via the bus 305. After the wide-angle image and the telescopic image are generated in accordance with the foregoing explanations, the generated images are stored in the second memory section 308 temporarily. In addition, the wide-angle image and the telescopic image stored in the second memory section 308 are transmitted to the image-displaying apparatus 104. The transmitted images are displayed as through-images, e.g., the foregoing translucent images in the liquid crystal display in the finder section 908 so that the camera user can select composition, i.e., an object image having a desirable perspective angle. A method for the display arrangement in the finder is explained as follows.

Figure 14:
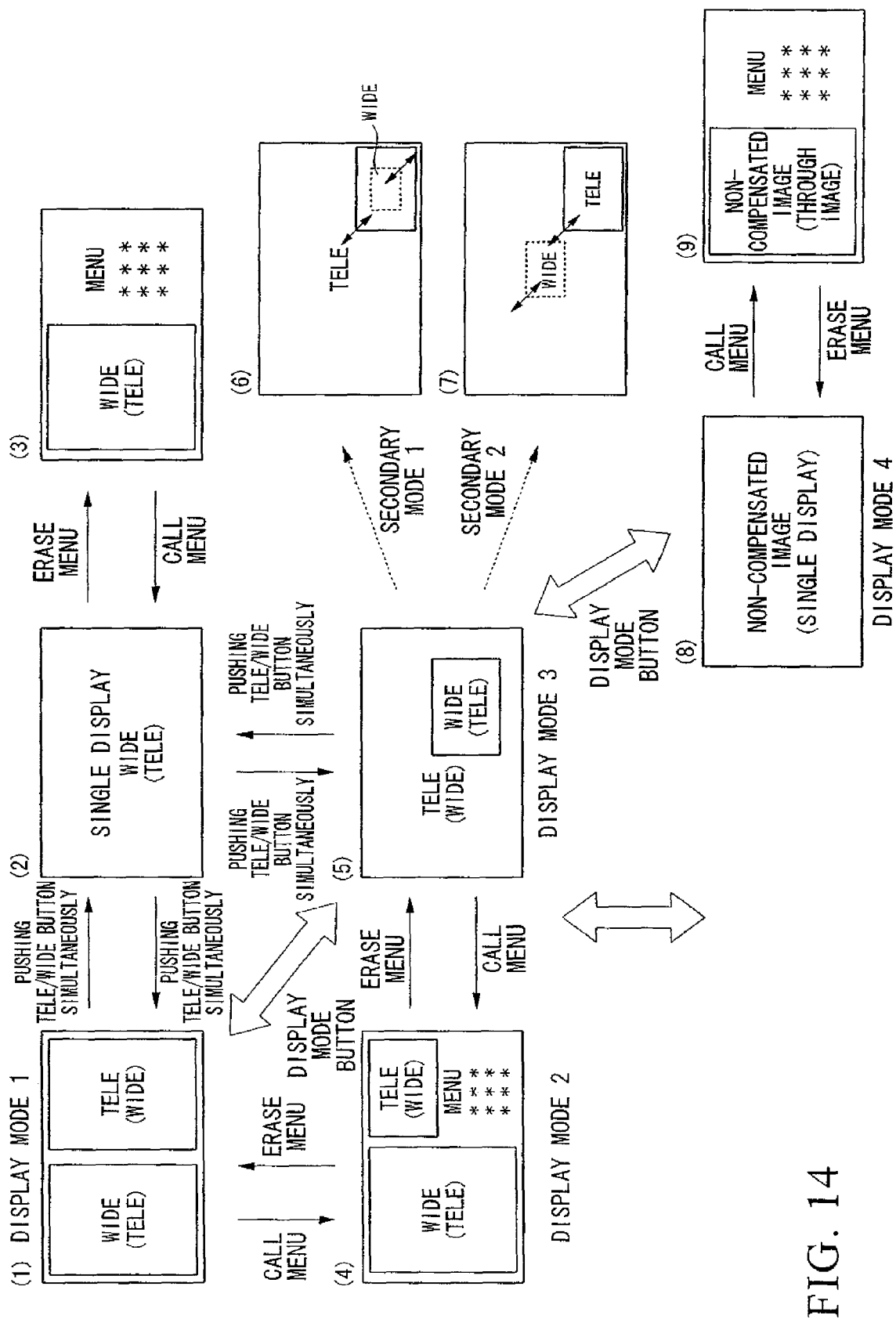
FIG. 14 is a flow chart for showing through-images in the finder. The flow chart shows the first to fourth display modes; two secondary modes, and nine flow lines (1) to (9).

FIG. 14 is a flow chart of display modes with respect to through-images in the finder.

Display mode-1 (see (1) in FIG. 14) is explained in detail with reference to the operation of the user interface (shown in FIG. 12A) displayed in the display panel in the finder. The wide-angle image and the telescopic image are disposed side-by-side in the display mode-1 (see (1) in FIG. 14).

<Switching Images Disposed Side-by-Side>

Figure 13A:
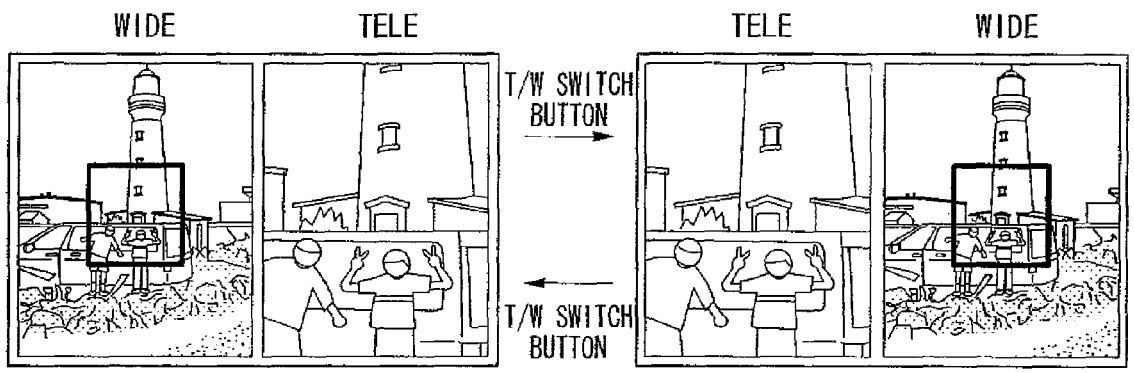
FIGS. 13A to 13C show how views in the finder change by the Tele/Wide switching button.

The wide-angle image and the telescopic image disposed side-by-side as shown in FIG. 13A can be switched by using the Tele/Wide switching button 1205. The camera user can fix the position of the desired zoomed image by switching these images side-by-side. In addition, such operation may improve visibility of the object image for the camera user.

<Mode for Single-Display View>

Either the wide-angle image or the telescopic image can be displayed in the finder (see (2) in FIG. 14) if the Tele/Wide switching button 1205 and either the Tele button 1204 or the Wide button 1206 are pressed down simultaneously. Alternatively, the single display view may be obtained by pressing the Tele button 1204 and the Wide button 1206 simultaneously (see (2) in FIG. 14). In the latter case, it may be defined that the image disposed in a left-hand side should be viewed in the single-display view. The state in the flow chart goes back to the display mode-1 (see (1) in FIG. 14) if the Tele button 1204 and the Wide button 1206 are pressed down simultaneously in the single-display view. Although such single-display view has been commonly realized in ordinary digital cameras, the side-by-side display view of the display mode-1 can be switched to the single-display view in the present invention. Therefore, such switching operations propose various options to the user of a camera using the present invention with respect to the selectivity of composition. Therefore, the camera user can capture the intended object image reliably.

<Mode for Displaying Menu>

The display mode is switched to display mode-2 (see (4) in FIG. 14) if the capture-mode button 1203 is double-clicked. If the capture-mode button 1203 is double-clicked again, the previously-displayed menu disappears, i.e., the display mode goes back to display mode-1 (see (1) in FIG. 14). In addition, white balance and exposure condition can be changed in the menu. Also, if the white balance and the exposure condition are changed using the menu, parameters corresponding to the changes are transmitted to the CPU 306 followed by the operation section 107, the input-interface 309, and the bus 305. After the above explained compensations, the wide-angle image and the telescopic image stored in the second memory section 308 are updated. Furthermore, the updated wide-angle image and the updated telescopic image are transmitted to the image-displaying apparatus 104 so as to be displayed on the liquid crystal display in the finder section 908.

The camera user of a camera using the present invention can change display modes variously using the menu while observing the object. By doing this, the camera user can recognize composition, blurred phase, and depth of field in the finder after changing the condition, e.g., the white balance; therefore, the camera user can avoid making a mistake in capturing the object image.

<Displaying Telescopic Image in Wide-Angle Image>

A frame defining a telescopic image is shown in a wide-angle image if the display-mode button 1202 is double-clicked. Alternatively, if the frame is appeared, when the display-mode button 1202 is double-clicked, the frame disappears. With respect to the appearance of the frame, the first display-position-calculating section 903 calculates the coordinates for displaying the frame in the finder based on image data, e.g., a magnified image and a reduced image. The camera user can recognize various factors of the telescopic image, e.g., countenance of an object-to-be-captured including the impression of a person, focus, and the depth of field. In addition, the camera user can recognize the composition in view of objects near a main object, and nearby landscape.

Display mode-2 (see (4) in FIG. 14) is explained below with reference to operation using the user interface (shown in FIG. 12A). The display-mode 2 shows a wide-angle image, a telescopic image, and the menu.

<Switching Images Disposed Side-by-Side>

Figure 13B:
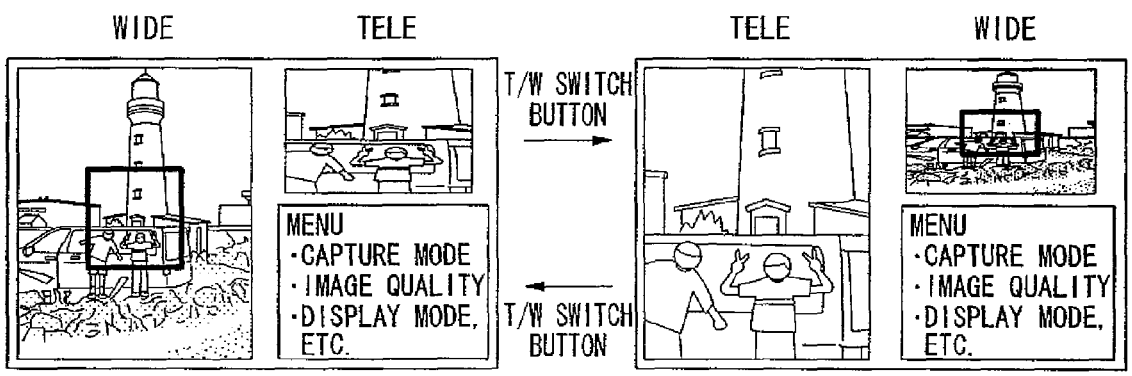
Figure 13C:
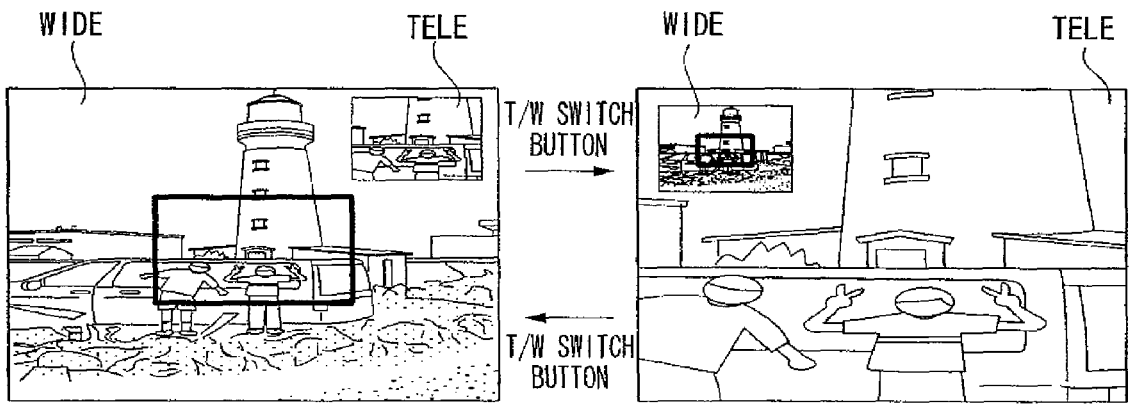

The wide-angle image and the telescopic image disposed side-by-side as shown in FIG. 13B can be switched by using the Tele/Wide switching button 1205. Since these images are switched side-by-side, the camera user can maintain the position of the desirable zoomed image in the wide-angle image. In addition, such an operation may improve the visibility of the object image for the camera user.

<Mode for Displaying Menu>

The menu can be displayed in the display mode-2 (see (4) in FIG. 14) by switching the display mode from the display mode-1 (see (1) in FIG. 14) and the display mode-3 (see (5) in FIG. 14). Therefore, if the capture-mode button 1203 is double-clicked while the previously-displayed mode is the display mode-1 (see (1) in FIG. 14), the menu disappears and the display mode goes back to the display mode-1 (see (1) in FIG. 14). If the capture-mode button 1203 is double-clicked while the previously-displayed mode is the display mode-3 (see (5) in FIG. 14), the menu disappears and the display mode goes back to the display mode-3 (see (5) in FIG. 14). In addition, white balance and exposure condition can be changed in the menu. Also, if the white balance and the exposure condition are changed using the menu, parameters corresponding to the changes are transmitted to the CPU 306, followed by the operation section 107, the input-interface 309, and the bus 305. After the above explained compensations, the wide-angle image and the telescopic image stored in the second memory section 308 are updated. Furthermore, the updated wide-angle image and the updated telescopic image are transmitted to the image-displaying apparatus 104 so as to be displayed on the liquid crystal display in the finder section 908. The camera user can change display modes in different ways using the menu while observing the object. By doing this, the camera user can recognize composition, blurred phase, and depth of field in the finder; after changing the condition, e.g. the white balance, therefore, the camera user can avoid making a mistake in capturing the object image.

<Displaying Telescopic Image in Wide-Angle Image>

A frame defining a telescopic image is shown in a wide-angle image if the display-mode button 1202 is double-clicked. Alternatively, if the frame is appeared, when the display-mode button 1202 is double-clicked, the frame disappears. With respect to the appearance of the frame, the first display-position-calculating section 903 calculates the coordinates for displaying the frame in the finder based on image data, e.g., a magnified image and a reduced image. The camera user can recognize various factors of the telescopic image, e.g., the countenance of an object-to-be-captured including the impression of a person, focus, and the depth of field. In addition, the camera user can recognize composition in view of objects near a main object, and nearby landscape.

Display mode-3 (see (5) in FIG. 14) is explained as follows with reference to operations using the user interface (shown in FIG. 12A). As shown in (5) in FIG. 14, the display mode-3 displays the telescopic image in full-size in the finder. Such a fill size view is hereinafter called as a main view. The wide-angle image is displayed in a part of the main view. Such part is hereinafter called a subsidiary view. In this display mode, reverse arrangement may be available in which the telescopic image is displayed in the main view and the wide-angle image is displayed in the subsidiary view.

<Switching the Main View and the Subsidiary View>

The wide-angle image and the telescopic image can be switched by pressing the Tele/Wide switching button 1205. That is, the wide-angle image is replaced by the telescopic image while the telescopic image is replaced by the wide-angle image. By doing this, since the main view and the subsidiary view are switched, the camera user can select the desirable display mode in accordance with his preference, e.g., the camera user needs to capture the zoomed image; and the zoomed image is viewed for merely reference information. In addition, such operation may improve visibility of the object image for the camera user.

<Single Display View>

Either the wide-angle image or the telescopic image can be displayed in the finder if the Tele/Wide switching button 1205 and either the Tele button 1204 or the Wide button 1206 are pressed down simultaneously. Alternatively, the single display view may be obtained by pressing down the Tele button 1204 and the Wide button 1206 simultaneously. In the latter case, it may be defined that the image displayed in the main view should be viewed in the single-display view. The state of the flow chart goes back to the display mode-3 (see (5) in FIG. 14) if the Tele button 1204 and the Wide button 1206 are pressed down simultaneously in the single-display view. If the capture-mode button 1203 is double-clicked in the single-display view, the menu appears. Although such a single-display view has been commonly realized in ordinary digital cameras, the main view including the subsidiary view of the display mode-3 (see (5) in FIG. 14) can be switched to the single-display view in the present invention. Therefore, such switching operations proposes various options to the user of a camera using the present invention with respect to the selectivity of composition. Therefore, the camera user can capture the intended object image reliably.

<Mode for Displaying Menu>

The display mode is switched to display mode-2 (see (4) in FIG. 14) if the capture-node button 1203 is double-clicked. If the capture-mode button 1203 is double-clicked again, the previously-displayed menu disappears, i.e., the display mode goes back to the display mode-3 (see (5) in FIG. 14). In addition, white balance and exposure condition can be changed in the menu. Also, if the white balance and the exposure condition are changed using the menu, parameters corresponding to the changes are transmitted to the CPU 306, followed by the operation section 107, the input-interface 309, and the bus 305. After the above explained compensations, the wide-angle image and the telescopic image stored in the second memory section 308 are updated. Furthermore, the updated wide-angle image and the updated telescopic image are transmitted to the image-displaying apparatus 104 so as to be displayed on the liquid crystal display in the finder section 908.

The camera user can change display modes variously using the menu while observing the object. By doing this, the camera user can recognize composition, blurred phase, and depth of field in the finder after changing the condition e.g., the white balance; therefore, the camera user can avoid making a mistake in capturing the object image.

<Displaying Telescopic Image in Wide-Angle Image>

A frame defining a telescopic image is shown in a wide-angle image if the display-mode button 1202 is double-clicked. Alternatively, if the frame is appeared, when the display-mode button 1202 is double-clicked, the frame disappears. With respect to the appearance of the frame, the first display-position-calculating section 903 calculates the coordinates for displaying the frame in the finder based on image data, e.g., a magnified image and a reduced image. The camera user can recognize various factor of the telescopic image, e.g., the countenance of an object-to-be-captured including an impression of a person, focus, and the depth of field. In addition, the camera user can recognize the composition in view of objects near a main object, and nearby landscape.

<Secondary Mode-1>

The frame size of the subsidiary view can be changed using the display-mode button 1202 and the frame-moving key 1207. If the frame size is changed in accordance with (6) in FIG. 14, i.e., the telescopic image corresponds to the main view, and the wide-angle image corresponds to the subsidiary view. Such arrangement is hereinafter called secondary mode-1.

If the frame indicating the telescopic image is shown in the wide-angle image, the frame size changes accordingly. With respect to the appearance of the frame, the first display-position-calculating section 903 calculates the coordinates for displaying the frame in the finder based on image data, e.g., a magnified image and a reduced image. When the subsidiary image and the main view are the same in size, the images interchange between the subsidiary view and the main view. The result of interchanging the images is shown in (7) of FIG. 14 showing the secondary mode-2 in which the wide-angle image corresponds to the main view and the telescopic image corresponds to the subsidiary view. The second display-position-calculating section 904 calculates the coordinates of the frame to be displayed in the finder in accordance with signals generated by using the display-mode button 1202 and the frame-moving key 1207. By doing this, since the size of the subsidiary view can be changed, the camera user can select the desired display mode easily in accordance with his preference, e.g., the camera user needs to capture the zoomed image; and the zoomed image is viewed for merely reference information. Thus, such an operation may improve the visibility of the object image for the camera user.

<Secondary Mode-2>

The frame size of the subsidiary view can be changed using the display-mode button 1202 and the frame-moving key 1207. If the frame size is changed in accordance with (7) in FIG. 14, i.e., the wide-angle image corresponds to the main view, and the telescopic image corresponds to the subsidiary view. Such an arrangement is hereinafter called secondary mode-2. If the frame indicating the telescopic image is shown in the wide-angle image, the frame size changes in accordance with the size of the subsidiary view. With respect to the appearance of the frame, the first display-position-calculating section 903 calculates the coordinates for displaying the frame in the finder based on image data, e.g., the magnified image and the reduced image. When the subsidiary image and the main view are the same size, the images interchange between the subsidiary view and the main view. The result of interchanging the images is shown in (6) of FIG. 14, i.e., the secondary mode-1 in which the telescopic image corresponds to the main view and the wide-angle image corresponds to the subsidiary view. The second display-position-calculating section 904 calculates the coordinates of the frame to be displayed in the finder in accordance with signals generated by using the display-mode button 1202 and the frame-moving key 1207. By doing this, since the size of subsidiary view can be changed, the camera user can select the desired display mode easily in accordance with his preference, e.g., the camera user needs to capture the zoomed image; and the zoomed image is viewed for merely reference information. Thus, such operations may improve the visibility of the object image for the camera user.

The above-explained subsidiary view can be moved freely on the main view by the frame-moving key 1207. By doing this, if the object-to-be-captured is hidden by the subsidiary view, the object-to-be-captured can move on the main view. In this case, the subsidiary view can be moved alternatively; therefore, the camera user can follow the movement of the object-to-be-captured in the finder. The first display-position-calculating section 903 and the second display-position-calculating section 904 calculate the moved coordinates of the subsidiary view in the finder in accordance with signals generated by using the frame-moving key 1207.

Display mode-4 is explained with reference to operations using the user interface (shown in FIG. 12A).

Display method-4 (see (8) in FIG. 14) displays images having distortion. The display mode is set to the display mode-4 (see (8) in FIG. 14) by using the display-mode button 1202. After that, signals, i.e., image data are transmitted from the input-interface 309 disposed in the distortion-compensated-image-processing apparatus 103 to the CPU 306 via the bus 305. Furthermore, the image data, previously stored in the first memory section 307 and treated in the first image-processing section 302 are sent to the image-displaying apparatus 104. Coordinates of the image data-to-be-displayed in the finder is converted by the first display-position-calculating section 903 or the second display-position-calculating section 904 in the image-displaying apparatus 104. In this case the image data are not filtered. An object image, e.g., a landscape observed by the naked eye does not have distortion. Therefore, distortion included in the object image captured by the camera must be compensated. However, from an artistic point of view, if the captured object images extremely deformed, e.g., the object image is captured using a fish-eye lens, such an object image may be regarded as an art product. The image-capturing apparatus in accordance with the present invention can capture an object image having such a fish-eye effect easily in addition to an ordinary snap shot.

<Mode for Displaying Menu>

The menu appears when the capture-mode button 1203 is double-clicked. Adjustability of the compensation can be varied in the menu. The image data adjusted using the menu is transmitted from the input-interface 309 disposed in the distortion-compensated-image-processing apparatus 103 to the CPU 306 via the bus 305. After that, the image data is treated in the distortion-compensating section 303 and the second image-processing section 304 based on the image data filtered in the first image-processing section 302 and stored in the first memory section 307. By doing this, distortion compensation can be carried out instantly.

In a conventional image-capturing apparatus, distortion has been compensated after the object image is captured. In the present invention, the distortion included in the object image can be compensated not only after the object image is captured but also before the object image is captured. Therefore, modifying the captured object image will not be necessary.

The first embodiment of the present invention has been explained above in details with reference to the drawings. However, it should be understood that the drawings and detailed description are not intended to limit the invention to the particular form disclosed; thus, the invention disclosed herein is susceptible to various modifications and alternative forms, i.e., design changes within a scope of the present invention. For example, with respect to the arrangement of the views in the finder, the first embodiment has been explained with reference to two sets of images. However, the present invention is not limited to such an arrangement, i.e., more than two images can be displayed; distortion may be compensated by two or more channels of at least two image-processing circuits; and distortion may be compensated using the Time Interval Difference method.

Second Embodiment

The second embodiment of the image-capturing apparatus in accordance with the present invention is explained below in detail with reference to the drawings.

Figure 17:
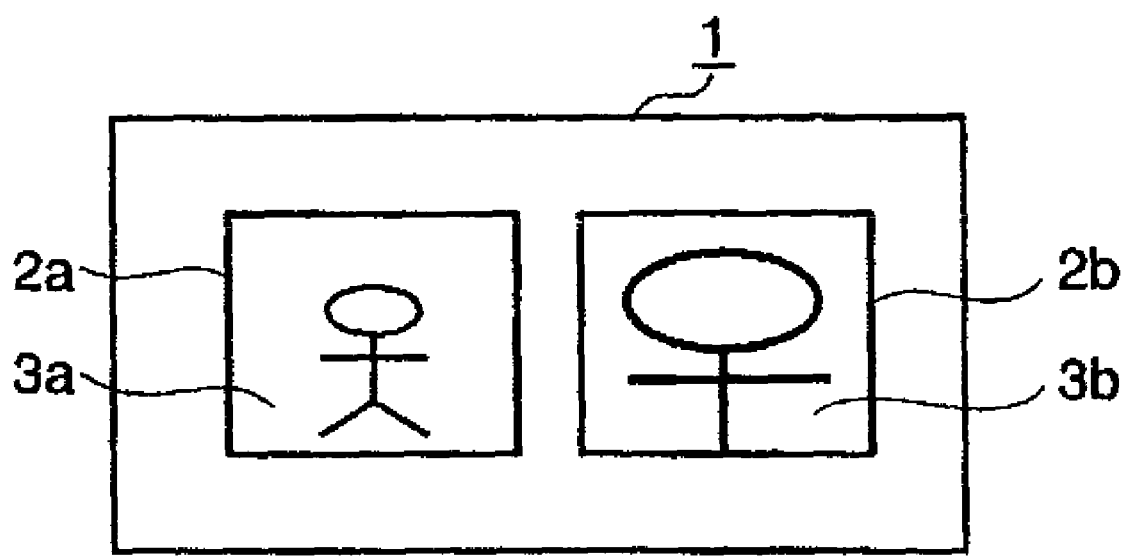
FIG. 17 shows as to how the second aspect of the present invention displays images in display panels.

FIG. 17 shows as to how a second aspect of the present invention displays images in a display panel. An image-display apparatus 1 is built in cameras, e.g., digital cameras.

An image-displaying apparatus shown in FIG. 17 has a plurality of display panels 2a and 2b. These display panels 2a and 2b are, e.g., LCD monitors.

An object image 3a having a first perspective angle is displayed in the display panel 2a. Also, object image 3b having a second perspective angle is displayed in the display panel 2b. The first perspective angle is different from the second perspective angle. The first perspective angle of the object image 3a and the second perspective angle of the display panel 2a are generated from a common initial image data. An example in FIG. 17 shows that the first perspective angle corresponds to a wide-angle image and the second perspective angle corresponds to a telescopic image. Hereinafter the first image indicates the wide-angle image, and second image indicates the telescopic image.

In the second embodiment of the present invention, since the image-displaying apparatus having a plurality of display panels is built in the digital camera, each object image corresponding to a different perspective angle can be displayed in each display panel. By doing this, the camera user can observe these object images corresponding to the different perspectives before capturing the object image having more a desirable perspective angle.

Figure 18:
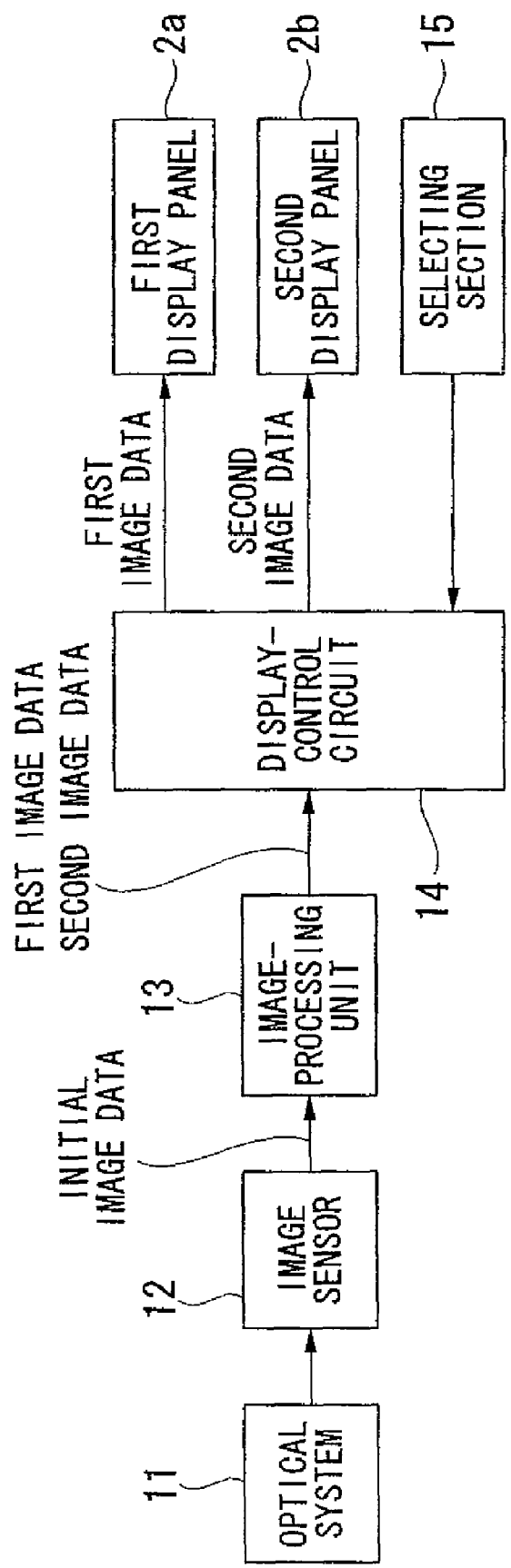
FIG. 18 is a block diagram showing main structural components of a digital camera which has the image-displaying apparatus in accordance with the second embodiment of the present invention.

FIG. 18 is a block diagram of main components included in a digital camera having the image-displaying apparatus shown in FIG. 17. The digital camera shown in FIG. 18 has: an optical system 11; an image sensor 12; an image-processing circuit 13; a display-control circuit 14; and the above explained display panels 2a and 2b. The optical system 11 is the same as the optical system 101 imparting distortion to the object image explained in the first embodiment so that a peripheral portion of the object image is reduced.

Figure 21:
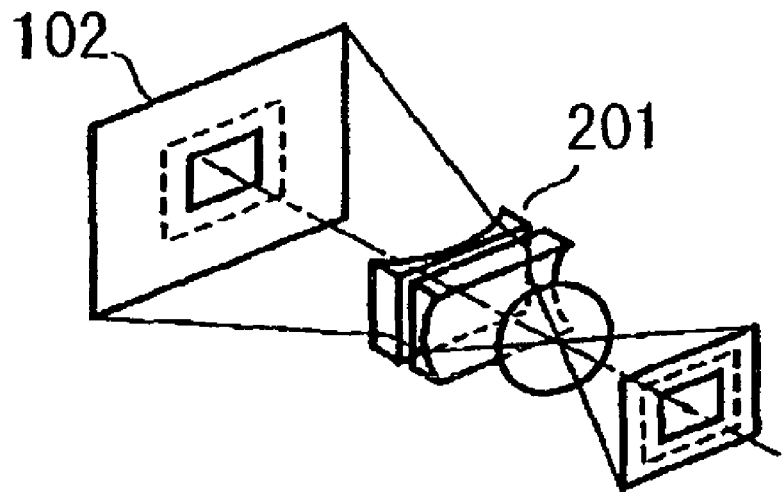
FIG. 21 shows an optical system of the present invention which imparts distortion.

The optical system 11 shown in FIG. 18 is an optical system 201 which imparts distortion to the input object image so that a central portion of the object image is magnified and a peripheral portion of the object image is reduced as shown e.g., in FIG. 21. The image sensor 12 has a light receiving surface onto which the object image input by the optical system 11 is focused. The image sensor 12 converts the focused object image to image data, and outputs the converted image data to the image-processing circuit 13 as an initial image data. The image-processing circuit 13 generates first image data used for displaying the wide-angle image 3a; and second image data used for displaying the telescopic image 3b based on the initial image data output from the image sensor 12. The display-control circuit 14 controls the image data, e.g., displaying the wide-angle image 3a generated based on the first image data in the display panel 2a; and displaying the telescopic image 3b generated based on the second image data in the display panel 2b.

Operation of the digital camera shown in FIG. 18 is explained as follows.

Figure 19:
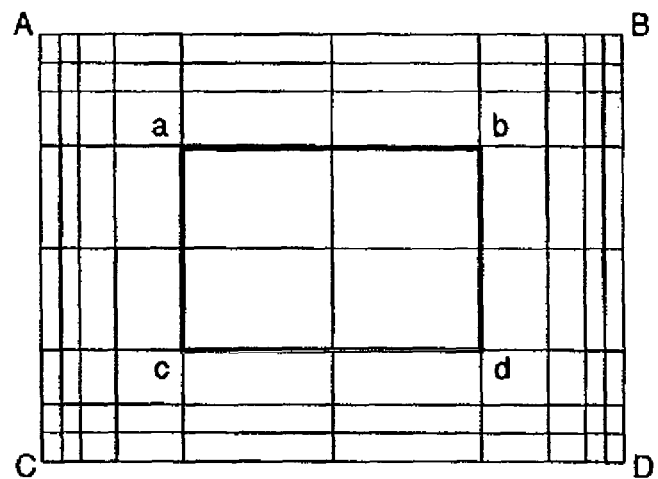
FIG. 19 shows an initial image data obtained by the image sensor.

With respect to the distortion, a central portion of the object image input by the optical system 11 is magnified, and a peripheral portion of the object image is reduced. The object image focused on the light-receiving surface of the image sensor 12 is converted to an electric signal. The converted electric signal is converted to a digital signal; thus, image data, e.g., the initial image data can be obtained. FIG. 19 shows an example for the initial image data obtained by the image sensor 12 having received a grid pattern based on a square unit. The central portion of the grid pattern focused on the light receiving surface is magnified, and the peripheral portion thereof is reduced. Such deformation is imparted by the above explained optical system 11. The initial image data based on such a deformed grid pattern is input to the image-processing circuit 13.

The image-processing circuit 13 generates the first image data and the second image data based on the input initial image data. Since the first image data corresponds to wide-angle image, the first image data is generated based on a whole area of the initial image data, i.e., an area defined by four points ABCD. Since the second image data corresponds to telescopic image, the second image data is generated based on a central portion of the initial image data, i.e., an area defined by four points a-b-c-d. The perspective angle used in the present embodiment is not limited to those shown in FIG. 19, i.e., the perspective angle used in the present embodiment may be modified.

Figure 20:
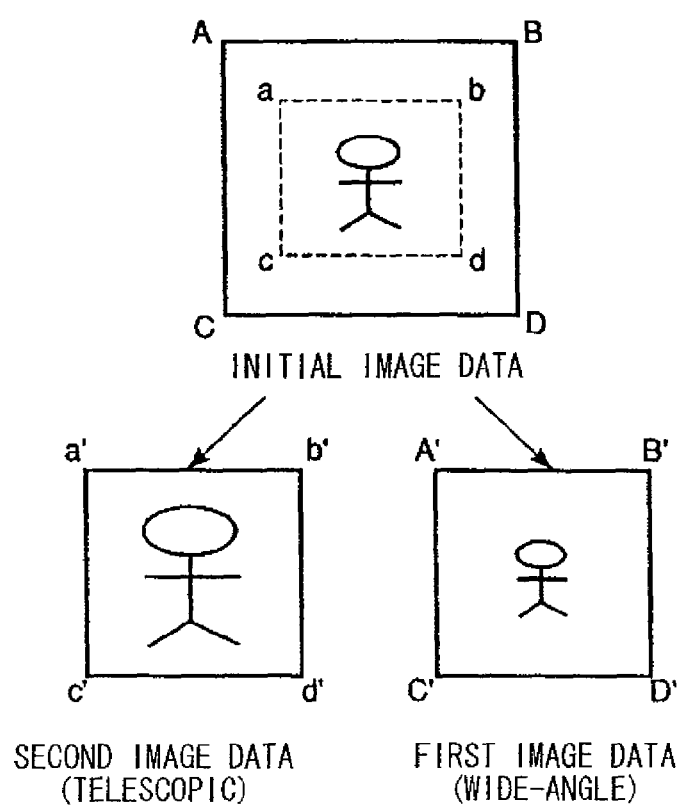
FIG. 20 shows the concept of how the first image data and the second image data are generated based on the initial image data.

FIG. 20 shows a concept for generating the first image data and the second image data based on the initial image data.

The first image data is generated as follows. The previously-reduced peripheral portion of the area A-B-C-D having the first perspective angle is magnified, and the previously-magnified central portion thereof is reduced. After that, the area A-B-C-D is reshaped to adjust to the display panel 2a, i.e., the area A-B-C-D is reshaped to area A'-B'-C'-D' shown in FIG. 20. The second image data is generated as follows. Distortion in the image data corresponding to the area a-b-c-d having the second perspective angle is compensated in the same manner as the above explanation. After that, the area a-b-c-d is reshaped to adjust to the display panel 2b, i.e., the area a-b-c-d is reshaped to area a'-b'-c'-d' shown in FIG. 20. The first and second image data generated by the image-processing circuit 13 are output to the display-control circuit 14.

The display-control circuit 14 controls the display panels, e.g., the wide-angle image 3a is displayed in the first display panel 2a based on the first image data; and the telescopic image 3b is displayed in the second display panel 2b based on the second image data.

According to the second embodiment of the present invention, the object image generated by compensating the distortion is displayed in two sets of display panels based on the two kinds of different perspective angles. For example, the image data displayed in the display panel is updated periodically based on image data obtained sequentially by the image sensor 12. The updated image data is displayed as the translucent image. By doing this, the camera user can recognize the perspective angle of the object image-to-be-captured with reference to the translucent image; and after that, the camera user can capture the object image having a desirable perspective angle which is suitable for his personal aesthetic preference.

One of the display panels 2a and 2b may display the translucent image, and the other display panel may display the latest, i.e., captured object image. Alternatively, one of the display panels 2a and 2b may be a non-touch display panel for displaying the translucent image, and the other display panel may be a touch panel in which menu items can be selected by a contact manner and/or a non-contact manner. In this case, dirt, e.g., a human finger print adheres to the touch panel. However, the non-touch display panel showing the translucent image does not have such dirt thereon. Therefore, at least one of the display panels can always display a clear image in the present embodiment.

If the object image is captured continuously and quickly, the display panel 2a and 2b may display the captured image alternately.

One of the display panels 2a and 2b may switch a plurality of the translucent images. Also, one of the display panels 2a and 2b may by able to display the translucent images simultaneously. Also, the image-displaying apparatus of the present embodiment may have a selecting section 15 for selecting one of the translucent images arbitrarily so that the selected translucent image is displayed in the other display panel.

Also, the selecting section 15 may be able to select an arbitrary portion of the object image displayed on one of the display panels; and the selected portion may be magnified and displayed in the other display panel.

The object image based on a common perspective angle may be displayed on both display panels 2a and 2b. In this case, one of the display panels may display a mark which indicates the central portion for enhancing the visibility thereof.

The present embodiment is not limited to the use of two sets of display panels. That is, more than three sets of display panels may be used in the present embodiment so that more than three object images based on three different perspective angles are displayed.

The second embodiment of the present invention has been explained above in detail. However, it should be understood that the drawings and detailed description are not intended to limit the invention to the particular form disclosed; thus, the invention disclosed herein is susceptible to various modifications and alternative forms, i.e., design changes within a scope of the present invention.

Furthermore, the embodiments explained above contain various phases of the present invention, i.e., a variety of inventions may be derived from the present embodiments. For example, as long as the present invention is lacking at least one of its elements, e.g., constituting the apparatus of the present invention can achieve the above explained effects; such a structure lacking those elements may still be inventive.

What is claimed is:

1. An image capturing apparatus comprising:
an optical system imparting distortion to an image of an object to be captured, the distortion being so that a central portion of the image is magnified and a peripheral portion is reduced;
an image sensor having an image-capturing element having a receiving surface, onto which the image having the distortion is focused by the optical system, for converting the focused image including the distortion into initial image data and outputting thereof;
an image processing circuit for compensating the distortion in the initial image data having a first perspective angle established to the same initial image data and a second perspective angle which is different from the first perspective angle; and generating first and second images that do not include the distortion corresponding to the first and second perspective angles;
a finder for displaying at least one of the first and second images;
a display-control circuit having a simultaneous display mode which can display the first and the second images in a view in the finder simultaneously;
a memory apparatus for storing the first and the second images; and
a capture-mode-selector for selecting one of a first-capture mode and a second-capture mode:
wherein the first perspective angle and the second perspective angle are determined in the first-capture mode to store the first image and the second image in the memory apparatus; the first image is displayed in the second-capture mode; the second perspective angle to store only the second image is set in the second-capture mode; and the display-control circuit further has a filtering section for filtering the image in accordance with the selected capture mode so that the image having the perspective angle not to be stored is filtered differently from the image which has been determined to be stored.

2. An image capturing apparatus comprising:
an optical system imparting distortion to an image of an object to be captured, the distortion being so that a central portion of the image is magnified and a peripheral portion is reduced;
an image sensor having an image-capturing element having a receiving surface, onto which the image having the distortion is focused by the optical system, for converting the focused image including the distortion into initial image data and outputting thereof;
an image processing circuit for compensating the distortion in the initial image data having a first perspective angle established to the same initial image data and a second perspective angle which is different from the first perspective angle; and generating first and second images that do not include the distortion corresponding to the first and second perspective angles;
a finder for displaying at least one of the first and second images; and
a display-control circuit having a simultaneous display mode which can display the first and the second images in a view in the finder simultaneously, wherein the display-control circuit displays a frame which indicates an outline of one of the first and the second images so that one of the images is a full image which contains the other image, the frame indicating an outline of the contained image.

3. An image capturing apparatus comprising:
an optical system imparting distortion to an image of an object to be captured, the distortion being so that a central portion of the image is magnified and a peripheral portion is reduced;
an image sensor having an image-capturing element having a receiving surface, onto which the image having the distortion is focused by the optical system, for converting the focused image including the distortion into initial image data and outputting thereof;
an image processing circuit for compensating the distortion in the initial image data having a first perspective angle established to the same initial image data and a second perspective angle which is different from the first perspective angle; and generating first and second images that do not include the distortion corresponding to the first and second perspective angles;
a finder for displaying at least one of the first and second images; and
a display-control circuit having a simultaneous display mode which can display the first and the second images in a view in the finder simultaneously, wherein the display-control circuit displays a frame which indicates an outline of one of the first and the second images so that one of the images is a full image which contains the other image, the frame indicating an outline of the contained image, wherein the display-control circuit differentiates a property belonging to the full image from a property belonging to the contained image.

4. An image capturing apparatus comprising:
an optical system imparting distortion to an image of an object to be captured, the distortion being so that a central portion of the image is magnified and a peripheral portion is reduced;
an image sensor having an image-capturing element having a receiving surface, onto which the image having the distortion is focused by the optical system, for converting the focused image including the distortion into initial image data and outputting thereof;
an image processing circuit for compensating the distortion in the initial image data having a first perspective angle established to the same initial image data and a second perspective angle which is different from the first perspective angle; and generating first image and second images that do not include the distortion corresponding to the first and second perspective angles;
a finder for displaying at least one of the first and second images; and
a display-control circuit including:
filtering sections which filter the first image generated and filter differently the second image generated differently from the first image generated;
a simultaneous display mode which can display the first and the second images filtered in a view in the finder simultaneously;
a capture-mode-selecting section for selecting a first-capture mode or a second-capture mode: wherein
the first perspective angle and the second perspective angle are determined in the first-capture mode to store the first image and the second image in the memory apparatus: the first image is displayed in the second-capture mode, the second perspective angle to store only the second image is set in the second-capture mode: and the display-control circuit further has a filtering section for filtering the image in accordance with the selected capture mode so that the image having the perspective angle not to be stored is filtered differently from the image which has been determined to be stored.

* * * * *